US012770561B2

(12) United States Patent
Kim et al.

(10) Patent No.: US 12,770,561 B2
(45) Date of Patent: Oct. 20, 2026

(54) DISPLAY DEVICE AND MOBILE ELECTRONIC DEVICE INCLUDING SAME

(71) Applicant: Samsung Display Co., LTD., Yongin-si (KR)

(72) Inventors: Kyung Ho Kim, Yongin-si (KR); Na Hyeon Cha, Yongin-si (KR); Sang Yong No, Yongin-si (KR); Gi Chang Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 141 days.

(21) Appl. No.: 18/946,644

(22) Filed: Nov. 13, 2024

(65) Prior Publication Data

US 2025/0259597 A1 Aug. 14, 2025

(30) Foreign Application Priority Data

Feb. 8, 2024 (KR) ........................ 10-2024-0019563

(51) Int. Cl.
*G09G 3/32* (2016.01)
*G09G 3/3233* (2016.01)
(Continued)

(52) U.S. Cl.
CPC ... *G09G 3/3233* (2013.01); *G09G 2300/0443* (2013.01); *G09G 2340/0407* (2013.01)

(58) Field of Classification Search
CPC .......... G09G 3/3233; G09G 3/30; G09G 5/10; G09G 5/18; G09G 2300/04; G09G 2300/043; G09G 2300/0439; G09G 2300/0426; G09G 2300/0842; G09G 2340/0407; G09G 2310/0267; G09G 2310/0257; G09G 2310/262; G09G 2310/0251; G09G 2310/021;
(Continued)

(56) References Cited

U.S. PATENT DOCUMENTS 9,432,616 B1 8/2016 Hurd et al.
2021/0005144 A1* 1/2021 Long .................... G09G 3/3266
(Continued)

FOREIGN PATENT DOCUMENTS

KR 10-2022-0113584 A 8/2022

*Primary Examiner* — Wesner Sajous
(74) *Attorney, Agent, or Firm* — Womble Bond Dickinson (US) LLP

(57) ABSTRACT

According to one or more embodiments, a display device may include a display panel including a pixel group including a normal pixel, and interpolation pixels surrounding the normal pixel, wherein the normal pixel includes a driving transistor, and a normal light-emitting element configured to receive a driving current from the driving transistor, wherein the interpolation pixels include a first interpolation light-emitting element configured to receive a part of a first driving current from a first normal pixel, and a second interpolation light-emitting element configured to receive a part of a second driving current from a second normal pixel, and wherein a first interpolation emission pattern of the first interpolation light-emitting element is adjacent to the second normal pixel, and a second interpolation emission pattern of the second interpolation light-emitting element is adjacent to the first normal pixel.

20 Claims, 18 Drawing Sheets

(51) Int. Cl.

| | |
|---|---|
| ***G09G 5/10*** | (2006.01) |
| ***G09G 5/18*** | (2006.01) |
| ***H10K 59/12*** | (2023.01) |
| ***H10K 59/80*** | (2023.01) |

(58) Field of Classification Search
CPC ....... G09G 2310/0286; G09G 2310/08; G09G 3/3266; G09G 3/3225; G09G 3/3275; H10K 59/00; H10K 59/10; H10K 59/122–127; H10K 59/131; H10K 59/1213; H10K 59/8052
See application file for complete search history.

(56) References Cited

U.S. PATENT DOCUMENTS

| | | | | |
|---|---|---|---|---|
| 2021/0407424 | A1* | 12/2021 | Long | G09G 3/3266 |
| 2021/0407425 | A1* | 12/2021 | Huang | G09G 3/3266 |
| 2022/0122546 | A1* | 4/2022 | Long | G09G 3/035 |
| 2023/0197891 | A1 | 6/2023 | Goshonoo | |

* cited by examiner

DISPLAY DEVICE AND MOBILE ELECTRONIC DEVICE INCLUDING SAME

CROSS-REFERENCE TO RELATED APPLICATION

The present application claims priority to, and the benefit of, Korean Patent Application No. 10-2024-0019563 filed on Feb. 8, 2024, in the Korean Intellectual Property Office, the disclosure of which in its entirety is herein incorporated by reference.

BACKGROUND

1. Field

The present disclosure relates to a display device, and a mobile electronic device including the same.

2. Description of the Related Art

Wearable devices, in which a focus is formed at a distance close to user's eyes, have been developed in the form of glasses or a helmet. For example, the wearable device may be a head-mounted display (HMD) device or augmented reality (AR) glasses. The wearable device provides an augmented reality (AR) screen or a virtual reality (VR) screen to a user.

The wearable devices, such as the HMD device or the AR glasses, suitably use a display specification of approximately 3500 PPI (pixels per inch) or higher, so that a user may use it for a long time without dizziness. To this end, organic light-emitting diode on silicon (OLEDoS) technology that is a high-resolution small organic light-emitting display device is emerging. The organic light-emitting diode on silicon (OLEDoS) is technology for placing an organic light-emitting diode (OLED) on a semiconductor wafer substrate on which a complementary metal oxide semiconductor (CMOS) is located.

SUMMARY

Aspects of the present disclosure provide a display device capable of achieving up-scaling by arranging a plurality of interpolation pixels around a normal pixel, and capable of improving up-scaling efficiency by optimizing the positions of emission patterns of the interpolation pixels, and a mobile electronic device including the same.

According to one or more embodiments of the disclosure, a display device may include a display panel including a pixel group including a normal pixel, and interpolation pixels surrounding the normal pixel, wherein the normal pixel includes a driving transistor, and a normal light-emitting element configured to receive a driving current from the driving transistor, wherein the interpolation pixels include a first interpolation light-emitting element configured to receive a part of a first driving current from a first normal pixel, and a second interpolation light-emitting element configured to receive a part of a second driving current from a second normal pixel, and wherein a first interpolation emission pattern of the first interpolation light-emitting element is adjacent to the second normal pixel, and a second interpolation emission pattern of the second interpolation light-emitting element is adjacent to the first normal pixel.

The first normal pixel may include a first normal light-emitting element, wherein the second normal pixel includes a second normal light-emitting element, wherein the second interpolation emission pattern is between a first normal emission pattern of the first normal light-emitting element and the first interpolation emission pattern, and wherein the first interpolation emission pattern is between a second normal emission pattern of the second normal light-emitting element and the second interpolation emission pattern.

The pixel group may include the normal pixel at a center of the pixel group, a first interpolation pixel in a first plane direction from the normal pixel, a second interpolation pixel in a second plane direction, which is opposite to the first plane direction, from the normal pixel, a third interpolation pixel in a third plane direction, which is substantially perpendicular to the first plane direction, from the normal pixel, a fourth interpolation pixel in a fourth plane direction, which is opposite to the third plane direction, from the normal pixel, a fifth interpolation pixel in a first diagonal direction, which is between the first plane direction and the third plane direction, from the normal pixel, a sixth interpolation pixel in a second diagonal direction, which is between the second plane direction and the third plane direction, from the normal pixel, a seventh interpolation pixel in a third diagonal direction, which is opposite to the second diagonal direction, from the normal pixel, and an eighth interpolation pixel in a fourth diagonal direction, which is opposite to the first diagonal direction, from the normal pixel.

The first and second interpolation pixels may be configured to receive a driving current from the normal pixel in the first plane direction and the second plane direction of the first and second interpolation pixels, respectively.

With respect to the first and second interpolation pixels, the first normal pixel may be in the first plane direction from the first and second interpolation pixels, wherein, with respect to the first and second interpolation pixels, the second normal pixel is in the second plane direction from the first and second interpolation pixels.

The third and fourth interpolation pixels may be configured to receive a driving current from the normal pixel in the third plane direction and the fourth plane direction of the third and fourth interpolation pixels, respectively.

With respect to the third and fourth interpolation pixels, the first normal pixel may be in the third plane direction from the third and fourth interpolation pixels, wherein, with respect to the third and fourth interpolation pixels, the second normal pixel is in the second plane direction from the third and fourth interpolation pixels.

The fifth, sixth, seventh, and eighth interpolation pixels may be configured to receive a driving current from the normal pixel in the first, second, third, and fourth diagonal directions of the fifth, sixth, seventh, and eighth interpolation pixels, respectively.

The fifth, sixth, seventh, and eighth interpolation pixels may further include a third interpolation light-emitting element configured to receive a part of a third driving current from a third normal pixel, and a fourth interpolation light-emitting element configured to receive a part of a fourth driving current from a fourth normal pixel.

The third normal pixel may include a third normal light-emitting element, wherein the fourth normal pixel includes a fourth normal light-emitting element, wherein a third interpolation emission pattern of the third interpolation light-emitting element is adjacent to the fourth normal pixel, and wherein a fourth interpolation emission pattern of the fourth interpolation light-emitting element is adjacent to the third normal pixel.

With respect to the fifth, sixth, seventh, and eighth interpolation pixels, the first normal pixel may be in the first diagonal direction from the fifth, sixth, seventh, and eighth interpolation pixels, the second normal pixel may be in the second diagonal direction from the fifth, sixth, seventh, and eighth interpolation pixels, the third normal pixel may be in the third diagonal direction from the fifth, sixth, seventh, and eighth interpolation pixels, and the fourth normal pixel may be in the fourth diagonal direction from the fifth, sixth, seventh, and eighth interpolation pixels.

In the fifth, sixth, seventh, and eighth interpolation pixels, the first, second, third, and fourth interpolation emission patterns may be in a 2*2 matrix form.

In the first and second interpolation pixels, the first interpolation emission pattern may include a pair of first sub-interpolation emission patterns separated from each other, and the second interpolation emission pattern may include a pair of second sub-interpolation emission patterns separated from each other.

In the first and second interpolation pixels, the pair of first sub-interpolation emission patterns and the pair of second sub-interpolation emission patterns may be in a 2*2 matrix form.

In the first and second interpolation pixels, the pair of first sub-interpolation emission patterns and the pair of second sub-interpolation emission patterns may be in a 1*4 matrix form.

In the third and fourth interpolation pixels, the third interpolation emission pattern may include a pair of third sub-interpolation emission patterns separated from each other, and the fourth interpolation emission pattern may include a pair of fourth sub-interpolation emission patterns separated from each other.

In the third and fourth interpolation pixels, the pair of third sub-interpolation emission patterns and the pair of fourth sub-interpolation emission patterns may be in a 2*2 matrix form.

In the third and fourth interpolation pixels, the pair of third sub-interpolation emission patterns and the pair of fourth sub-interpolation emission patterns may be in a 4*1 matrix form.

According to one or more embodiments of the disclosure, a mobile electronic device may include a display panel in which a normal pixel, and interpolation pixels surrounding the normal pixel, form a pixel group, wherein the normal pixel includes a driving transistor, and a normal light-emitting element configured to receive a driving current from the driving transistor, wherein the interpolation pixels include a first interpolation light-emitting element configured to receive a part of a first driving current from a first normal pixel, and a second interpolation light-emitting element configured to receive a part of a second driving current from a second normal pixel, and wherein a first interpolation emission pattern of the first interpolation light-emitting element is adjacent to the second normal pixel, and a second interpolation emission pattern of the second interpolation light-emitting element is adjacent to the first normal pixel.

The first normal pixel may include a first normal light-emitting element, wherein the second normal pixel includes a second normal light-emitting element, wherein the second interpolation emission pattern is between a first normal emission pattern of the first normal light-emitting element and the first interpolation emission pattern, and wherein the first interpolation emission pattern is between a second normal emission pattern of the second normal light-emitting element and the second interpolation emission pattern.

In the display device and the mobile electronic device including the same according to embodiments, up-scaling is achieved by arranging the plurality of interpolation pixels around the normal pixel, and up-scaling efficiency may be increased by optimizing the positions of the emission patterns of the interpolation pixels.

BRIEF DESCRIPTION OF THE DRAWINGS

The above and other aspects of the present disclosure will become more apparent by describing in detail embodiments thereof with reference to the attached drawings, in which.

DETAILED DESCRIPTION

Figure 1:
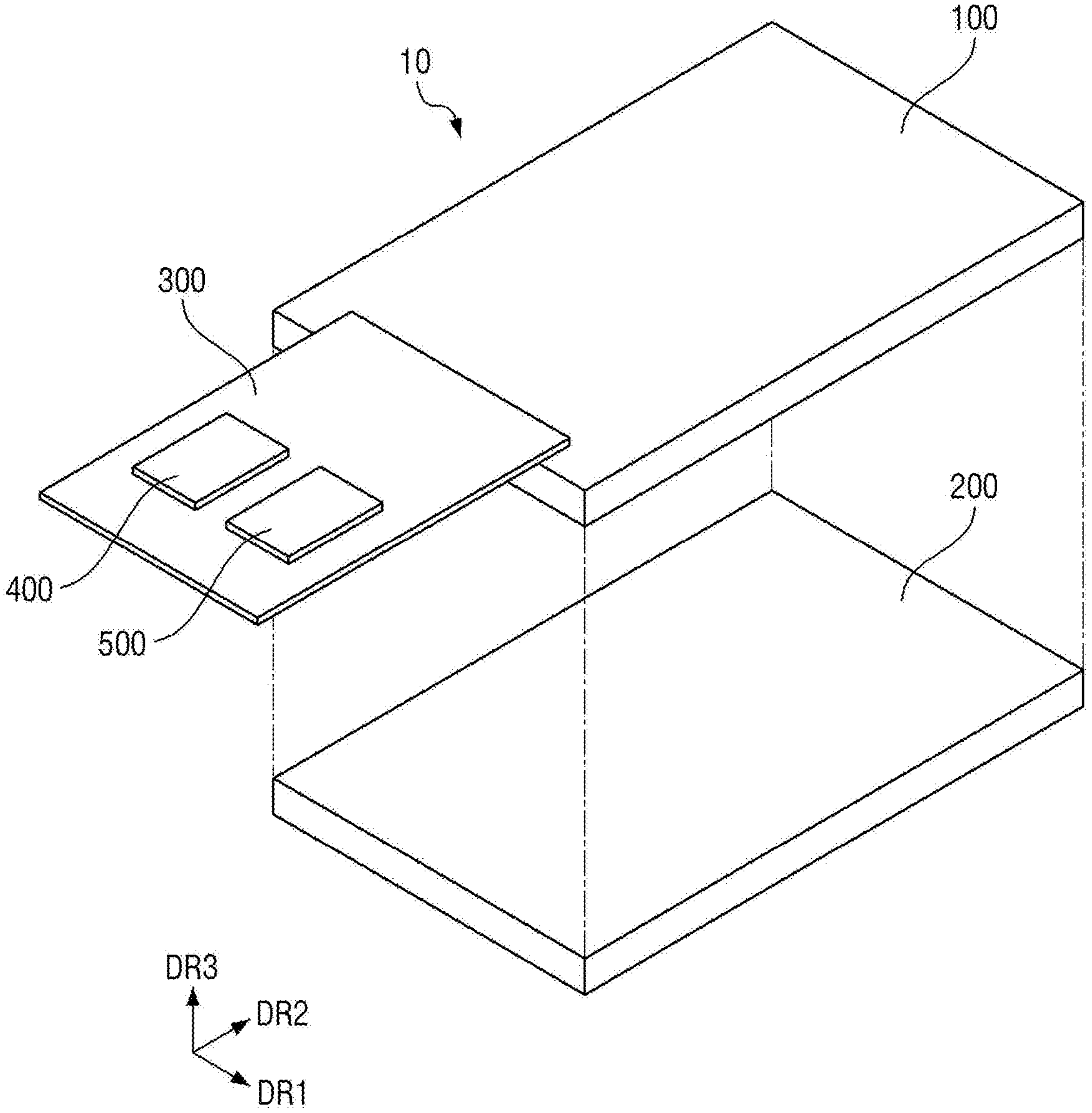
FIG. 1 is an exploded perspective view showing a display device according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
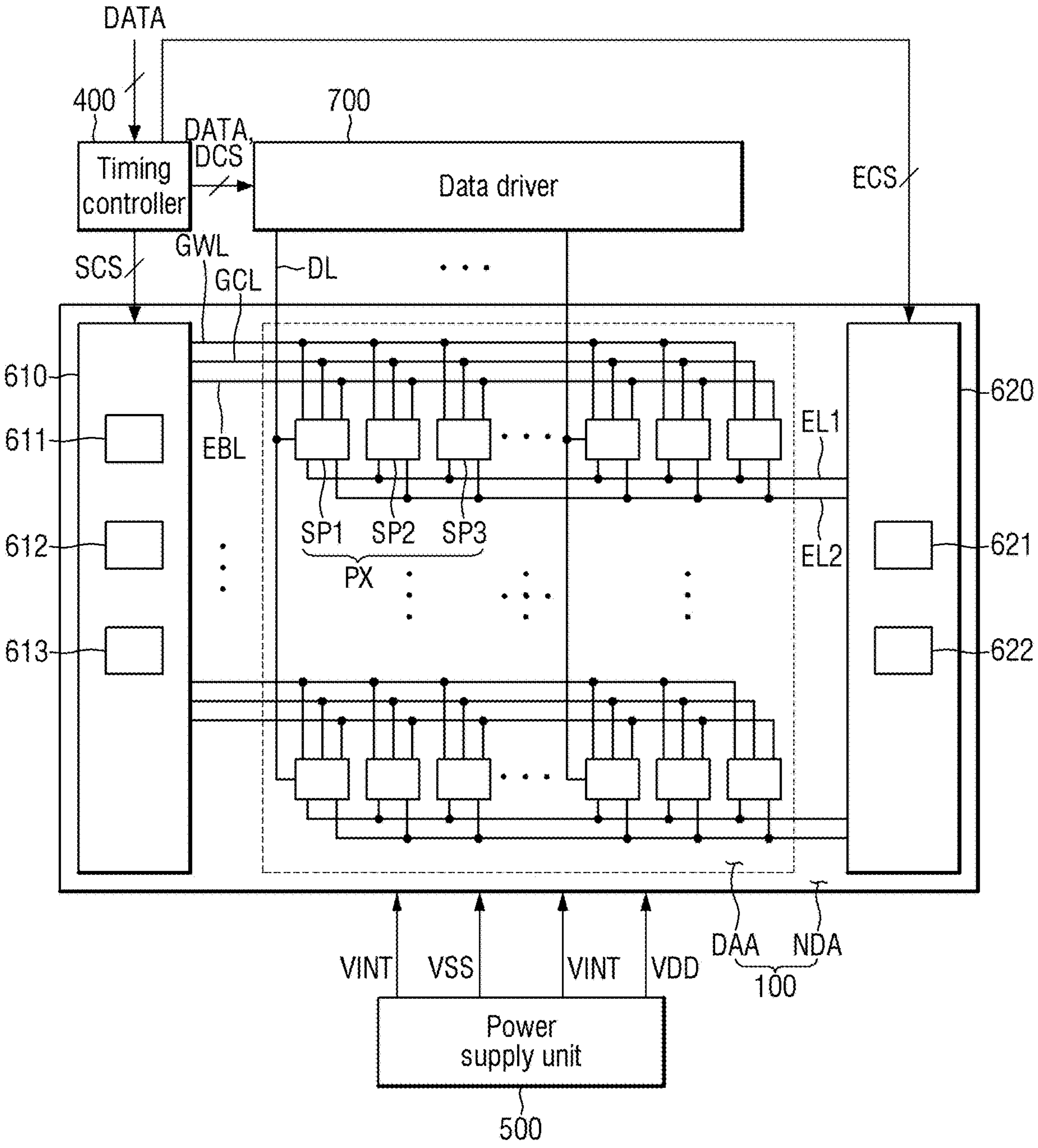
FIG. 2 is a block diagram illustrating a display device according to one or more embodiments.

FIG. 1 is an exploded perspective view showing a display device according to one or more embodiments. FIG. 2 is a block diagram illustrating a display device according to one or more embodiments.

Referring to FIGS. 1 and 2, a display device 10 according to one or more embodiments is a device displaying a moving image or a still image. The display device 10 according to one or more embodiments may be applied to portable electronic devices, such as a mobile phone, a smartphone, a tablet personal computer, a mobile communication terminal, an electronic organizer, an electronic book, a portable multimedia player (PMP), a navigation system, an ultra-mobile PC (UMPC) or the like. For example, the display device 10 according to one or more embodiments may be applied as a display unit of a television, a laptop, a monitor, a billboard, or an Internet-of-Things (IoT) terminal. Alternatively, the display device 10 according to one or more embodiments may be applied to a smart watch, a watch phone, a head-mounted display (HMD) for implementing virtual reality and augmented reality, and the like.

The display device 10 according to one or more embodiments includes a display panel 100, a heat dissipation layer 200, a circuit board 300, a timing control circuit 400, and a power supply circuit 500.

The display panel 100 may have a planar shape similar to a quadrilateral shape. For example, the display panel 100 may have a planar shape similar to a quadrilateral shape, having a short side of a first direction DR1, and a long side of a second direction DR2 crossing the first direction DR1. In the display panel 100, a corner where a short side in the first direction DR1 and a long side in the second direction DR2 meet may be right-angled or rounded with a curvature (e.g., predetermined curvature). The planar shape of the display panel 100 is not limited to a quadrilateral shape, and may be a shape similar to another polygonal shape, a circular shape, or an elliptical shape. The planar shape of the display device 10 may conform to the planar shape of the display panel 100, but the present disclosure is not limited thereto.

The display panel 100 includes a display area DAA for displaying an image, and a non-display area NDA not displaying an image, as shown in FIG. 2.

The display area DAA includes a plurality of pixels PX, a plurality of scan lines SL, a plurality of emission control lines EL, and a plurality of data lines DL.

The plurality of pixels PX may be arranged in a matrix form in the first direction DR1 and the second direction DR2. The plurality of scan lines SL and the plurality of emission control lines EL may extend in the first direction DR1, while being arranged in the second direction DR2. The plurality of data lines DL may extend in the second direction DR2, while being arranged in the first direction DR1.

The plurality of scan lines SL include a plurality of write scan lines GWL, a plurality of control scan lines GCL, and a plurality of bias scan lines EBL. The plurality of emission control lines EL include a plurality of first emission control lines EL1 and a plurality of second emission control lines EL2.

Figure 3:
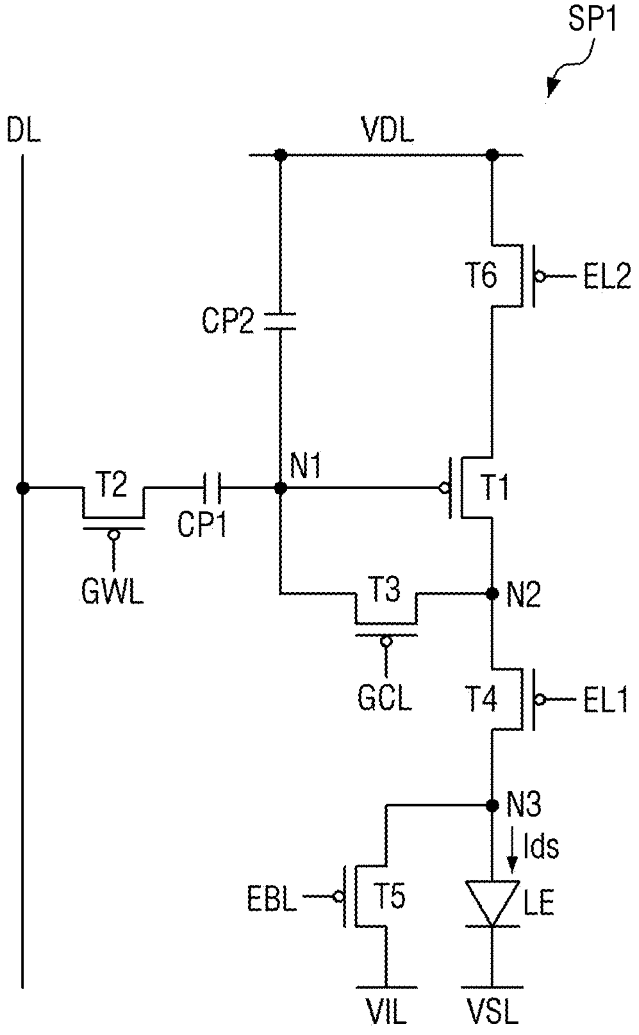
FIG. 3 is an equivalent circuit diagram of a first sub-pixel according to one or more embodiments.

The plurality of pixels PX include a plurality of sub-pixels SP1, SP2, and SP3. The plurality of sub-pixels SP1, SP2, and SP3 may include a plurality of pixel transistors as shown in FIG. 3, and the plurality of pixel transistors may be formed by a semiconductor process, and may be located on a semiconductor substrate SSUB (see FIG. 7). For example, the plurality of pixel transistors of a data driver 700 may be formed of complementary metal oxide semiconductor (CMOS).

Each of the plurality of sub-pixels SP1, SP2, and SP3 may be connected to any one write scan line GWL among the plurality of write scan lines GWL, any one control scan line GCL among the plurality of control scan lines GCL, any one bias scan line EBL among the plurality of bias scan lines EBL, any one first emission control line EL1 among the plurality of first emission control lines EL1, any one second emission control line EL2 among the plurality of second emission control lines EL2, and any one data line DL among the plurality of data lines DL. Each of the plurality of sub-pixels SP1, SP2, and SP3 may receive a data voltage of the data line DL in response to a write scan signal of the write scan line GWL, and may emit light from the light-emitting element according to the data voltage.

The non-display area NDA includes a scan driver 610, an emission driver 620, and the data driver 700.

The scan driver 610 includes a plurality of scan transistors, and the emission driver 620 includes a plurality of light-emitting transistors. The plurality of scan transistors and the plurality of light-emitting transistors may be formed on the semiconductor substrate SSUB (see FIG. 7) through a semiconductor process. For example, the plurality of scan transistors and the plurality of light-emitting transistors may be formed of CMOS. Although it is illustrated in FIG. 2 that the scan driver 610 is located on the left side of the display area DAA and the emission driver 620 is located on the right side of the display area DAA, the present disclosure is not limited thereto. For example, the scan driver 610 and the emission driver 620 may be located on both the left side and the right side of the display area DAA.

The scan driver 610 may include a write scan signal output unit 611, a control scan signal output unit 612, and a bias scan signal output unit 613. Each of the write scan signal output unit 611, the control scan signal output unit 612, and the bias scan signal output unit 613 may receive a scan-timing control signal SCS from the timing control circuit 400. The write scan signal output unit 611 may generate write scan signals according to the scan-timing control signal SCS of the timing control circuit 400, and may output them sequentially to the write scan lines GWL. The control scan signal output unit 612 may generate control scan signals in response to the scan-timing control signal SCS, and may sequentially output them to the control scan lines GCL. The bias scan signal output unit 613 may generate bias scan signals according to the scan-timing control signal SCS, and may output them sequentially to bias scan lines EBL.

The emission driver 620 includes a first emission control driver 621 and a second emission control driver 622. Each of the first emission control driver 621 and the second emission control driver 622 may receive the emission-timing control signal ECS from the timing control circuit 400. The first emission control driver 621 may generate first emission control signals according to the emission-timing control signal ECS, and may sequentially output them to the first emission control lines EL1. The second emission control driver 622 may generate second emission control signals according to the emission-timing control signal ECS, and may sequentially output them to the second emission control lines EL2.

The data driver 700 may include a plurality of data transistors, and the plurality of data transistors may be formed on the semiconductor substrate SSUB (see FIG. 7) through a semiconductor process. For example, the plurality of data transistors may be formed of CMOS.

The data driver 700 may receive digital video data DATA and a data-timing control signal DCS from the timing control circuit 400. The data driver 700 converts the digital video data DATA into analog data voltages according to the data-timing control signal DCS and outputs the analog data voltages to the data lines DL. In this case, the sub-pixels SP1, SP2, and SP3 are selected by the write scan signal of the scan driver 610, and data voltages may be supplied to the selected sub-pixels SP1, SP2, and SP3.

The heat dissipation layer 200 may overlap the display panel 100 in a third direction DR3, which is the thickness direction of the display panel 100. The heat dissipation layer 200 may be located on one surface of the display panel 100, for example, on the rear surface thereof. The heat dissipation layer 200 serves to dissipate heat generated from the display panel 100. The heat dissipation layer 200 may include a metal layer, such as graphite, silver (Ag), copper (Cu), or aluminum (Al) having high thermal conductivity.

The circuit board 300 may be electrically connected to a plurality of first pads PD1 (see FIG. 4) of a first pad portion PDA1 (see FIG. 4) of the display panel 100 by using a conductive adhesive member, such as an anisotropic conductive film. The circuit board 300 may be a flexible printed circuit board with a flexible material, or a flexible film. Although the circuit board 300 is illustrated in FIG. 1 as being unfolded, the circuit board 300 may be bent. In this case, one end of the circuit board 300 may be located on the rear surface of the display panel 100 and/or the rear surface of the heat dissipation layer 200. One end of the circuit board 300 may be an opposite end of the other end of the circuit board 300 connected to the plurality of first pads PD1 (see FIG. 4) of the first pad portion PDA1 (see FIG. 4) of the display panel 100 by using a conductive adhesive member.

The timing control circuit 400 may receive digital video data and timing signals inputted from the outside. The timing control circuit 400 may generate the scan-timing control signal SCS, the emission-timing control signal ECS, and the data-timing control signal DCS for controlling the display panel 100 in response to the timing signals. The timing control circuit 400 may output the scan-timing control signal SCS to the scan driver 610, and may output the emission-timing control signal ECS to the emission driver 620. The timing control circuit 400 may output the digital video data and the data-timing control signal DCS to the data driver 700.

The power supply circuit 500 may generate a plurality of panel driving voltages according to a power voltage from the outside. For example, the power supply circuit 500 may generate a first driving voltage VSS, a second driving voltage VDD, and a third driving voltage VINT, and may supply them to the display panel 100. The first driving voltage VSS, the second driving voltage VDD, and the third driving voltage VINT will be described later in conjunction with FIG. 3.

Each of the timing control circuit 400 and the power supply circuit 500 may be formed as an integrated circuit (IC), and may be attached to one surface of the circuit board 300. In this case, the scan-timing control signal SCS, the emission-timing control signal ECS, the digital video data DATA, and the data-timing control signal DCS of the timing control circuit 400 may be supplied to the display panel 100 through the circuit board 300. Further, the first driving voltage VSS, the second driving voltage VDD, and the third driving voltage VINT of the power supply circuit 500 may be supplied to the display panel 100 through the circuit board 300.

Alternatively, each of the timing control circuit 400 and the power supply circuit 500 may be located in the non-display area NDA of the display panel 100, similarly to the scan driver 610, the emission driver 620, and the data driver 700. In this case, the timing control circuit 400 may include a plurality of timing transistors, and each power supply circuit 500 may include a plurality of power transistors. The plurality of timing transistors and the plurality of power transistors may be formed on the semiconductor substrate SSUB (see FIG. 7) through a semiconductor process. For example, the plurality of timing transistors and the plurality of power transistors may be formed of CMOS. Each of the timing control circuit 400 and the power supply circuit 500 may be located between the data driver 700 and the first pad portion PDA1 (see FIG. 4).

FIG. 3 is an equivalent circuit diagram of a first sub-pixel according to one or more embodiments.

Referring to FIG. 3, the first sub-pixel SP1 may be connected to the write scan line GWL, the control scan line GCL, the bias scan line EBL, the first emission control line EL1, the second emission control line EL2, and the data line DL. Further, the first sub-pixel SP1 may be connected to a first driving voltage line VSL to which the first driving voltage VSS corresponding to a low potential voltage is applied, a second driving voltage line VDL to which the second driving voltage VDD corresponding to a high potential voltage is applied, and a third driving voltage line VIL to which the third driving voltage VINT corresponding to an initialization voltage is applied. That is, the first driving voltage line VSL may be a low potential voltage line, the second driving voltage line VDL may be a high potential voltage line, and the third driving voltage line VIL may be an initialization voltage line. In this case, the first driving voltage VSS may be lower than the third driving voltage VINT. The second driving voltage VDD may be higher than the third driving voltage VINT.

The first sub-pixel SP1 includes a plurality of transistors T1, T2, T3, T4, T5, and T6, a light-emitting element LE, a first capacitor CP1, and a second capacitor CP2.

The light-emitting element LE emits light in response to a driving current flowing through the channel of the first transistor T1. The emission amount of the light-emitting element LE may be proportional to the driving current. The light-emitting element LE may be located between the fourth transistor T4 and the first driving voltage line VSL. The first electrode of the light-emitting element LE may be connected to the drain electrode of the fourth transistor T4, and the second electrode thereof may be connected to the first driving voltage line VSL. The first electrode of the light-emitting element LE may be an anode electrode, and the second electrode of the light-emitting element LE may be a cathode electrode. The light-emitting element LE may be an organic light-emitting diode including a first electrode, a second electrode, and an organic light-emitting layer located between the first electrode and the second electrode, but the present disclosure is not limited thereto. For example, the light-emitting element LE may be an inorganic light-emitting element including a first electrode, a second electrode, and an inorganic semiconductor located between the first electrode and the second electrode, in which case the light-emitting element LE may be a micro light-emitting diode.

The first transistor T1 may be a driving transistor that controls a source-drain current (hereinafter referred to as a “driving current”) flowing between the source electrode and the drain electrode thereof according to a voltage applied to the gate electrode thereof. The first transistor T1 includes a gate electrode connected to a first node N1, a source electrode connected to the drain electrode of the sixth transistor T6, and a drain electrode connected to a second node N2.

The second transistor T2 may be located between one electrode of the first capacitor CP1 and the data line DL. The second transistor T2 is turned on by the write scan signal of the write scan line GWL to connect the one electrode of the first capacitor CP1 to the data line DL. Accordingly, the data voltage of the data line DL may be applied to the one electrode of the first capacitor CP1. The second transistor T2 includes a gate electrode connected to the write scan line GWL, a source electrode connected to the data line DL, and a drain electrode connected to the one electrode of the first capacitor CP1.

The third transistor T3 may be located between the first node N1 and the second node N2. The third transistor T3 is turned on by the write control signal of the write control line GCL to connect the first node N1 to the second node N2. For this reason, because the gate electrode and the source electrode of the first transistor T1 are connected, the first transistor T1 may operate like a diode. The third transistor T3 includes a gate electrode connected to the write control line GCL, a source electrode connected to the second node N2, and a drain electrode connected to the first node N1.

The fourth transistor T4 may be connected between the second node N2 and a third node N3. The fourth transistor T4 is turned on by the first emission control signal of the first emission control line EL1 to connect the second node N2 to the third node N3. Accordingly, the driving current of the first transistor T1 may be supplied to the light-emitting element LE. The fourth transistor T4 includes a gate electrode connected to the first emission control line EL1, a source electrode connected to the second node N2, and a drain electrode connected to the third node N3.

The fifth transistor T5 may be located between the third node N3 and the third driving voltage line VIL. The fifth transistor T5 is turned on by the bias scan signal of the bias scan line EBL to connect the third node N3 to the third driving voltage line VIL. Accordingly, the third driving voltage VINT of the third driving voltage line VIL may be applied to the first electrode of the light-emitting element LE. The fifth transistor T5 includes a gate electrode connected to the bias scan line EBL, a source electrode connected to the third node N3, and a drain electrode connected to the third driving voltage line VIL.

The sixth transistor T6 may be located between the source electrode of the first transistor T1 and the second driving voltage line VDL. The sixth transistor T6 is turned on by the second emission control signal of the second emission control line EL2 to connect the source electrode of the first transistor T1 to the second driving voltage line VDL. Accordingly, the second driving voltage VDD of the second driving voltage line VDL may be applied to the source electrode of the first transistor T1. The sixth transistor T6 includes a gate electrode connected to the second emission control line EL2, a source electrode connected to the second driving voltage line VDL, and a drain electrode connected to the source electrode of the first transistor T1.

The first capacitor CP1 is formed between the first node N1 and the drain electrode of the second transistor T2. The first capacitor CP1 includes one electrode connected to the drain electrode of the second transistor T2, and the other electrode connected to the first node N1.

The second capacitor CP2 is formed between the gate electrode of the first transistor T1 and the second driving voltage line VDL. The second capacitor CP2 includes one electrode connected to the gate electrode of the first transistor T1, and the other electrode connected to the second driving voltage line VDL.

The first node N1 is a junction between the gate electrode of the first transistor T1, the drain electrode of the third transistor T3, the other electrode of the first capacitor CP1, and the one electrode of the second capacitor CP2. The second node N2 is a junction between the drain electrode of the first transistor T1, the source electrode of the third transistor T3, and the source electrode of the fourth transistor T4. The third node N3 is a junction between the drain electrode of the fourth transistor T4, the source electrode of the fifth transistor T5, and the first electrode of the light-emitting element LE.

Each of the first to sixth transistors T1, T2, T3, T4, T5, and T6 may be a metal-oxide-semiconductor field effect transistor (MOSFET). For example, each of the first to sixth transistors T1, T2, T3, T4, T5, and T6 may be a P-type MOSFET, but the present disclosure is not limited thereto. Each of the first to sixth transistors T1, T2, T3, T4, T5, and T6 may be an N-type MOSFET. Alternatively, one or more of the first to sixth transistors T1, T2, T3, T4, T5, and T6 may be P-type MOSFETs, and one or more remaining transistors may be an N-type MOSFET.

Although it is illustrated in FIG. 3 that the first sub-pixel SP1 includes six transistors T1, T2, T3, T4, T5, and T6 and two capacitors C1 and C2, it should be noted that the equivalent circuit diagram of the first sub-pixel SP1 is not limited to that shown in FIG. 3. For example, the number of transistors and the number of capacitors of the first sub-pixel SP1 are not limited to those shown in FIG. 3.

Further, the equivalent circuit diagram of the second sub-pixel SP2 and the equivalent circuit diagram of the third sub-pixel SP3 may be substantially the same as the equivalent circuit diagram of the first sub-pixel SP1 described in conjunction with FIG. 3. Therefore, the redundant description of the equivalent circuit diagram of the second sub-pixel SP2 and the equivalent circuit diagram of the third sub-pixel SP3 is omitted in the present specification.

Figure 4:
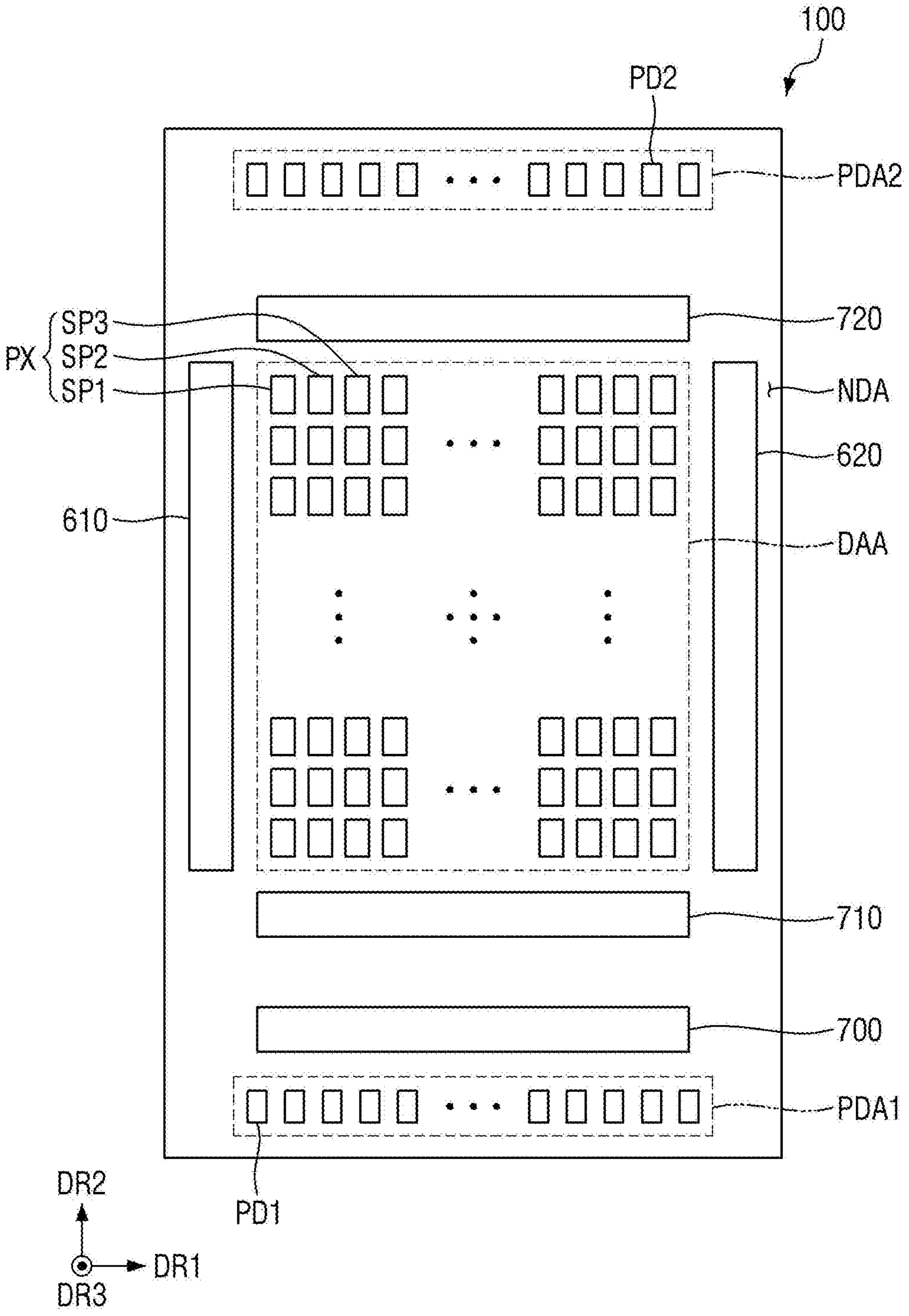
FIG. 4 is a layout diagram illustrating an example of a display panel according to one or more embodiments.

FIG. 4 is a layout diagram illustrating an example of a display panel according to one or more embodiments.

Referring to FIG. 4, the display area DAA of the display panel 100 according to one or more embodiments includes the plurality of pixels PX arranged in a matrix form. The non-display area NDA of the display panel 100 according to one or more embodiments includes the scan driver 610, the emission driver 620, the data driver 700, a first distribution circuit 710, a second distribution circuit 720, the first pad portion PDA1, and a second pad portion PDA2.

The scan driver 610 may be located on the first side of the display area DAA, and the emission driver 620 may be located on the second side of the display area DAA. For example, the scan driver 610 may be located on one side of the display area DAA in the first direction DR1, and the emission driver 620 may be located on the other side of the display area DAA in the first direction DR1. That is, the scan driver 610 may be located on the left side of the display area DAA, and the emission driver 620 may be located on the right side of the display area DAA. However, the present disclosure is not limited thereto, and the scan driver 610 and the emission driver 620 may be located on both the first side and the second side of the display area DAA.

The first pad portion PDA1 may include the plurality of first pads PD1 connected to pads or bumps of the circuit board 300 through a conductive adhesive member. The first pad portion PDA1 may be located on the third side of the display area DAA. For example, the first pad portion PDA1 may be located on one side of the display area DAA in the second direction DR2.

The first pad portion PDA1 may be located outside the data driver 700 in the second direction DR2. That is, the first pad portion PDA1 may be located closer to the edge of the display panel 100 than the data driver 700.

The second pad portion PDA2 may include a plurality of second pads PD2 corresponding to inspection pads that test whether the display panel 100 operates normally. The plurality of second pads PD2 may be connected to a jig or a probe pin during an inspection process, or may be connected to a circuit board for inspection. The circuit board for inspection may be a printed circuit board made of a rigid material or a flexible printed circuit board made of a flexible material.

The first distribution circuit 710 distributes data voltages applied through the first pad portion PDA1 to the plurality of data lines DL. For example, the first distribution circuit 710 may distribute the data voltages applied through one first pad PD1 of the first pad portion PDA1 to the P (P is a positive integer of 2 or more) data lines DL, and as a result, the number of the plurality of first pads PD1 may be reduced. The first distribution circuit 710 may be located on the third side of the display area DAA of the display panel 100. For example, the first distribution circuit 710 may be located on one side of the display area DAA in the second direction DR2. That is, the first distribution circuit 710 may be located on the lower side of the display area DAA.

The second distribution circuit 720 distributes signals applied through the second pad portion PDA2 to the scan driver 610, the emission driver 620, and the data lines DL. The second pad portion PDA2 and the second distribution circuit 720 may be configured to inspect the operation of each of the pixels PX in the display area DAA. The second distribution circuit 720 may be located on the fourth side of the display area DAA of the display panel 100. For example, the second distribution circuit 720 may be located on the other side of the display area DAA in the second direction DR2. That is, the second distribution circuit 720 may be located on the upper side of the display area DAA.

Figure 5:
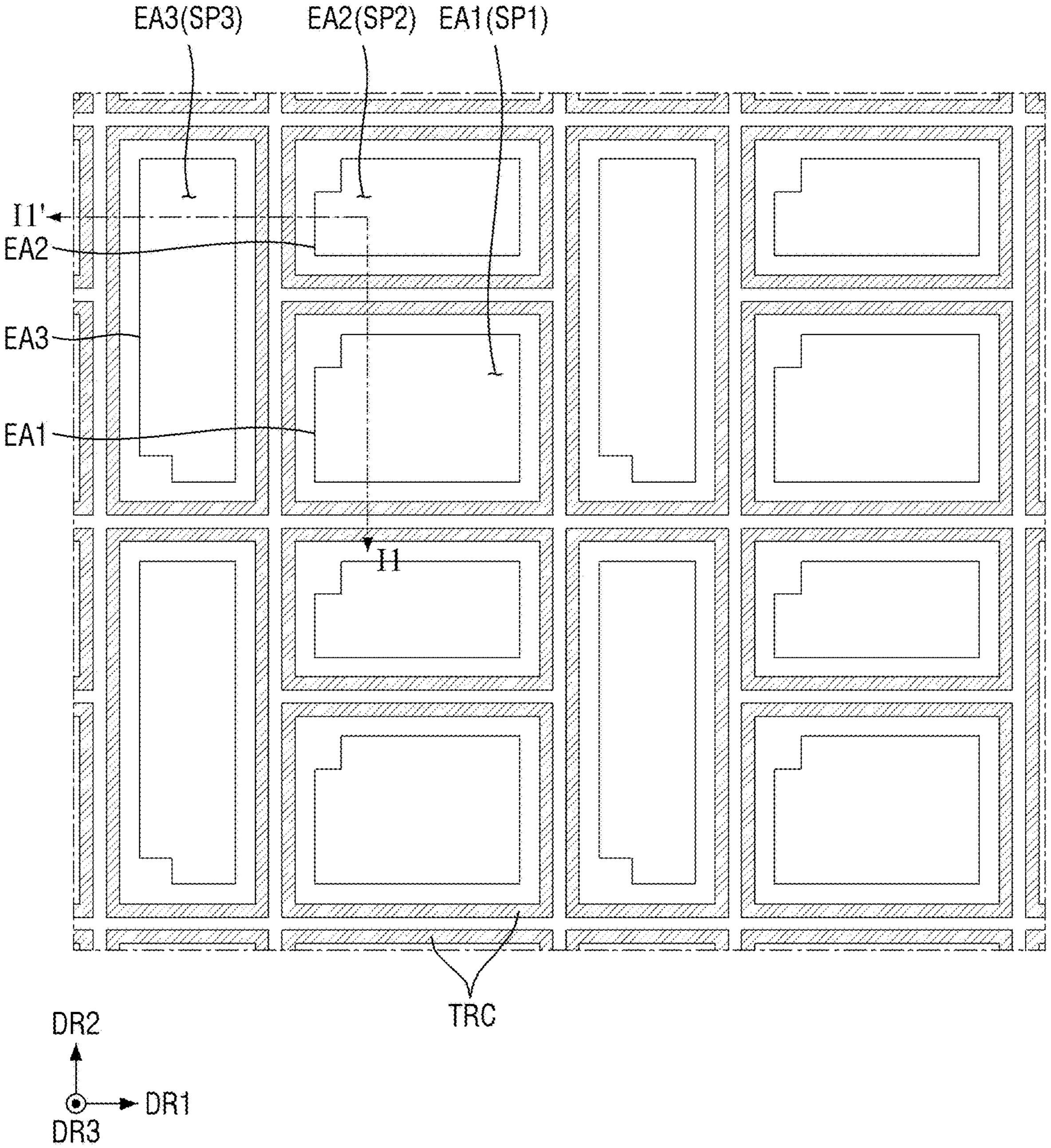
FIGS. 5 and 6 are layout diagrams illustrating embodiments of the display area of FIG. 4.
Figure 6:
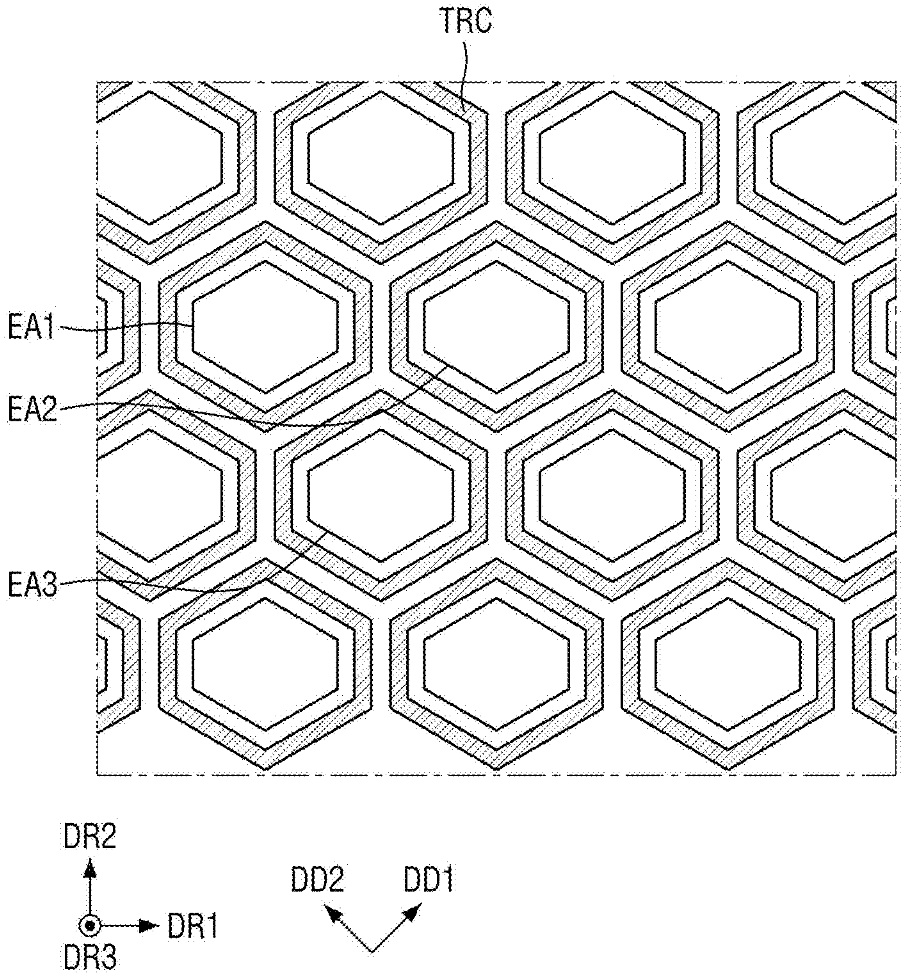

FIGS. 5 and 6 are layout diagrams illustrating embodiments of the display area of FIG. 4.

Referring to FIGS. 5 and 6, each of the pixels PX includes the first emission area EA1 that is an emission area of the first sub-pixel SP1, the second emission area EA2 that is an emission area of the second sub-pixel SP2, and the third emission area EA3 that is an emission area of the third sub-pixel SP3.

Each of the first emission area EA1, the second emission area EA2, and the third emission area EA3 may have a polygonal, circular, elliptical, or atypical shape in plan view.

The maximum length of the third emission area EA3 in the first direction DR1 may be less than the maximum length of the second emission area EA2 in the first direction DR1 and may be less than the maximum length of the first emission area EA1 in the first direction DR1. The maximum length of the second emission area EA2 in the first direction DR1 and the maximum length of the first emission area EA1 in the first direction DR1 may be substantially the same.

The maximum length of the third emission area EA3 in the second direction DR2 may be greater than the maximum length of the second emission area EA2 in the second direction DR2 and may be greater than the maximum length of the first emission area EA1 in the second direction DR2. The maximum length of the first emission area EA1 in the second direction DR2 may be greater than the maximum length of the second emission area EA2 in the second direction DR2.

The first emission area EA1, the second emission area EA2, and the third emission area EA3 may have, in plan view, a hexagonal shape formed of six straight lines as shown in FIG. 6, but the present disclosure is not limited thereto. The first emission area EA1, the second emission area EA2, and the third emission area EA3 may have a polygonal shape other than a hexagon, a circular shape, an elliptical shape, or an atypical shape in plan view.

As shown in FIG. 5, in each of the plurality of pixels PX, the first emission area EA1 and the second emission area EA2 may be adjacent to each other in the first direction DR1. Further, the first emission area EA1 and the third emission area EA3 may be adjacent to each other in the first direction DR1. In addition, the second emission area EA2 and the third emission area EA3 may be adjacent to each other in the second direction DR2. The area of the first emission area EA1, the area of the second emission area EA2, and the area of the third emission area EA3 may be different.

Alternatively, as shown in FIG. 6, the first emission area EA1 and the second emission area EA2 may be adjacent to each other in the first direction DR1, but the second emission area EA2 and the third emission area EA3 may be adjacent to each other in a first diagonal direction DD1, and the first emission area EA1 and the third emission area EA3 may be adjacent to each other in a second diagonal direction DD2. The first diagonal direction DD1 may be a direction between the first direction DR1 and the second direction DR2, and may refer to a direction inclined by about 45 degrees with respect to the first direction DR1 and the second direction DR2, and the second diagonal direction DD2 may be a direction perpendicular to the first diagonal direction DD1.

The first emission area EA1 may emit light of a first color, the second emission area EA2 may emit light of a second color, and the third emission area EA3 may emit light of a third color. Here, the light of the first color may be light of a blue wavelength band, the light of the second color may be light of a green wavelength band, and the light of the third color may be light of a red wavelength band. For example, the blue wavelength band may be a wavelength band of light whose main peak wavelength is in the range of about 370 nm to about 460 nm, the green wavelength band may be a wavelength band of light whose main peak wavelength is in the range of about 480 nm to about 560 nm, and the red wavelength band may be a wavelength band of light whose main peak wavelength is in the range of about 600 nm to about 750 nm.

It is illustrated in FIGS. 5 and 6 that each of the plurality of pixels PX includes three emission areas EA1, EA2, and EA3, but the present disclosure is not limited thereto. For example, each of the plurality of pixels PX may include four emission areas.

In addition, the layout of the emission areas of the plurality of pixels PX is not limited to that illustrated in FIGS. 5 and 6. For example, the emission areas of the plurality of pixels PX may be located in a stripe structure in which the emission areas are arranged in the first direction DR1, a PenTile® structure in which the emission areas are arranged in a diamond shape (PenTile® being a registered trademark of Samsung Display Co., Ltd., Republic of Korea), or a hexagonal structure in which the emission areas having, in plan view, a hexagonal shape are arranged side by side as shown in FIG. 6.

Figure 7:
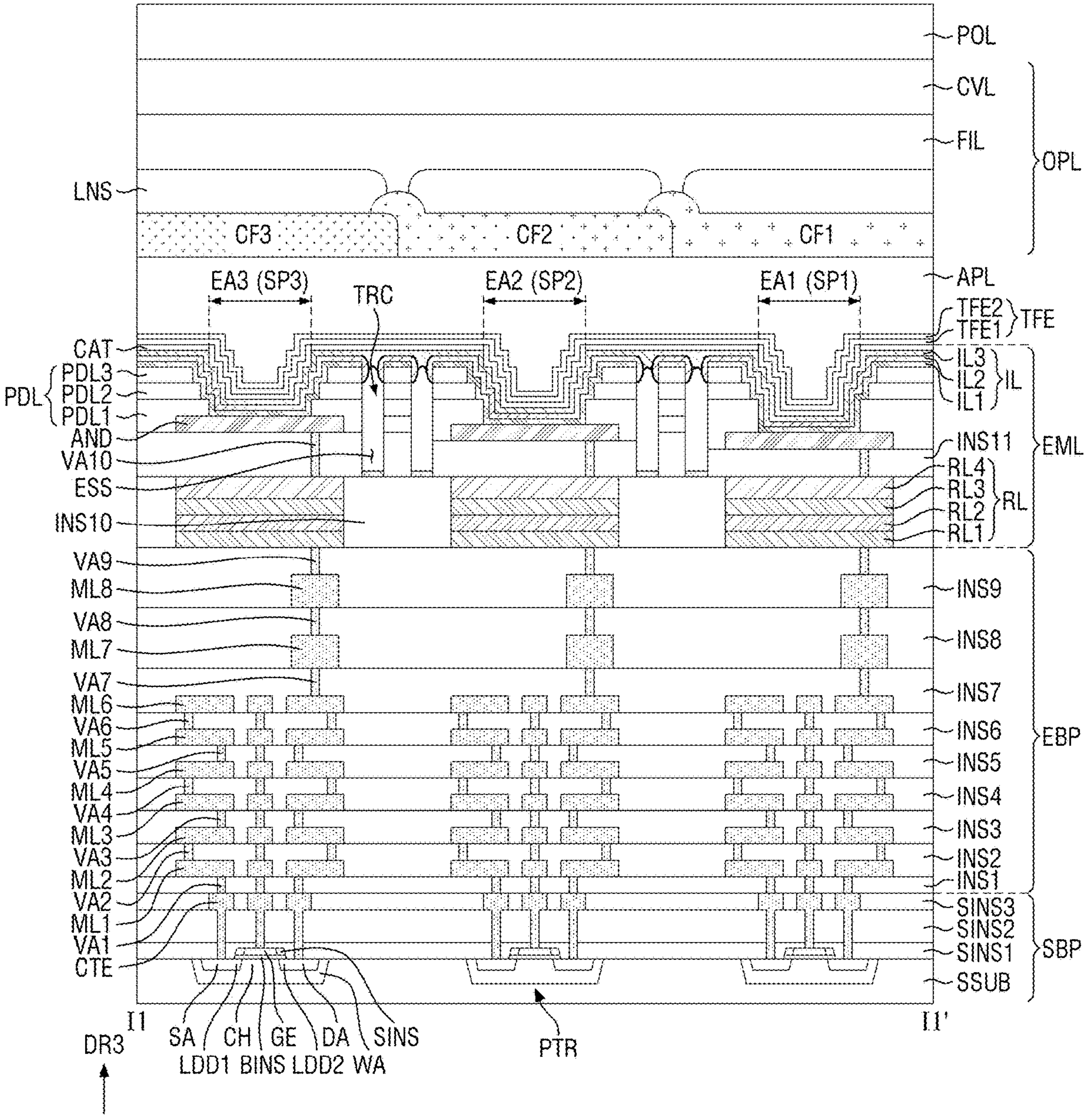
FIG. 7 is a cross-sectional view illustrating an example of a display panel taken along the line I1-I1' of FIG. 5.

FIG. 7 is a cross-sectional view illustrating an example of a display panel taken along the line I1-I1' of FIG. 5.

Referring to FIG. 7, the display panel 100 includes a semiconductor backplane SBP, a light-emitting element backplane EBP, a display element layer EML, an encapsulation layer TFE, an optical layer OPL, a cover layer CVL, and a polarizing plate POL.

The semiconductor backplane SBP includes the semiconductor substrate SSUB including a plurality of pixel transistors PTR, a plurality of semiconductor insulating layers covering the plurality of pixel transistors PTR, and a plurality of contact terminals CTE electrically connected to the plurality of pixel transistors PTR, respectively. The plurality of pixel transistors PTR may be the first to sixth transistors T1, T2, T3, T4, T5, and T6 described with reference to FIG. 4.

The semiconductor substrate SSUB may be a silicon substrate, a germanium substrate, or a silicon-germanium substrate. The semiconductor substrate SSUB may be a substrate doped with a first type impurity. A plurality of well regions WA may be located at the top surface of the semiconductor substrate SSUB. The plurality of well regions WA may be regions doped with a second type impurity. The second type impurity may be different from the aforementioned first type impurity. For example, when the first type impurity is a p-type impurity, the second type impurity may be an n-type impurity. Alternatively, when the first type impurity is an n-type impurity, the second type impurity may be a p-type impurity.

Each of the plurality of well regions WA includes a source region SA corresponding to the source electrode of the pixel transistor PTR, a drain region DA corresponding to the drain electrode thereof, and a channel region CH located between the source region SA and the drain region DA.

A lower insulating layer BINS may be located between a gate electrode GE and the well region WA. A side insulating layer SINS may be located on the side surface of the gate electrode GE. The side insulating layer SINS may be located on the lower insulating layer BINS.

Each of the source region SA and the drain region DA may be a region doped with the first type impurity. The gate electrode GE of the pixel transistor PTR may overlap the well region WA in the third direction DR3. The channel region CH may overlap the gate electrode GE in the third direction DR3. The source region SA may be located on one side of the gate electrode GE, and the drain region SA may be located on the other side of the gate electrode GE.

Each of the plurality of well regions WA further includes a first low-concentration impurity region LDD1 located between the channel region CH and the source region SA, and a second low-concentration impurity region LDD2 located between the channel region CH and the drain region DA. The first low-concentration impurity region LDD1 may be a region having a lower impurity concentration than the source region SA due to the lower insulating layer BINS. The second low-concentration impurity region LDD2 may be a region having a lower impurity concentration than the drain region DA due to the lower insulating layer BINS. The distance between the source region SA and the drain region DA may increase due to the presence of the first low-concentration impurity region LDD1 and the second low-concentration impurity region LDD2. Therefore, the length of the channel region CH of each of the pixel transistors PTR may increase, so that the likelihood of punch-through and hot carrier phenomena that might be caused by a short channel may be reduced or prevented.

A first semiconductor insulating layer SINS1 may be located on the semiconductor substrate SSUB. The first semiconductor insulating layer SINS1 may be formed of silicon carbonitride (SiCN) or a silicon oxide (SiOx)-based inorganic layer, but the present disclosure is not limited thereto.

A second semiconductor insulating layer SINS2 may be located on the first semiconductor insulating layer SINS1. The second semiconductor insulating layer SINS2 may be formed of a silicon oxide (SiOx)-based inorganic layer, but the present disclosure is not limited thereto.

The plurality of contact terminals CTE may be located on the second semiconductor insulating layer SINS2. Each of the plurality of contact terminals CTE may be connected to any one of the gate electrode GE, the source region SA, or the drain region DA of each of the pixel transistors PTR through holes penetrating the first semiconductor insulating layer SINS1 and the second semiconductor insulating layer INS2. The plurality of contact terminals CTE may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them.

A third semiconductor insulating layer SINS3 may be located on a side surface of each of the plurality of contact terminals CTE. The top surface of each of the plurality of contact terminals CTE may be exposed without being covered by the third semiconductor insulating layer SINS3. The third semiconductor insulating layer SINS3 may be formed of a silicon oxide (SiOx)-based inorganic layer, but the present disclosure is not limited thereto.

The semiconductor substrate SSUB may be replaced with a glass substrate or a polymer resin substrate, such as polyimide. In this case, thin film transistors may be located on the glass substrate or the polymer resin substrate. The glass substrate may be a rigid substrate that does not bend, and the polymer resin substrate may be a flexible substrate that can be bent or curved.

The light-emitting element backplane EBP includes a plurality of conductive layers ML1 to ML8, a plurality of vias VA1 to VA9, and a plurality of insulating layers INS1 to INS9. In addition, the light-emitting element backplane EBP includes a plurality of insulating layers INS1 to INS11 located between the first to eighth conductive layers ML1 to ML8.

The first to eighth conductive layers ML1 to ML8 serve to connect the plurality of contact terminals CTE exposed from the semiconductor backplane SBP to thereby implement the circuit of the first sub-pixel SP1 shown in FIG. 4. For example, the first to sixth transistors T1, T2, T3, T4, T5, and T6 are merely formed on the semiconductor backplane SBP, and the connection of the first to sixth transistors T1, T2, T3, T4, T5, and T6 and the first and second capacitors C1 and C2 is accomplished through the first to eighth conductive layers ML1 to ML8. In addition, the connection between the drain region corresponding to the drain electrode of the fourth transistor T4, the source region corresponding to the source electrode of the fifth transistor T5, and the first electrode of the light-emitting element LE is also accomplished through the first to eighth conductive layers ML1 to ML8.

The first insulating layer INS1 may be located on the semiconductor backplane SBP. Each of the first vias VA1 may penetrate the first insulating layer INS1 to be connected to the contact terminal CTE exposed from the semiconductor backplane SBP. Each of the first conductive layers ML1 may be located on the first insulating layer INS1 and may be connected to the first via VA1.

The second insulating layer INS2 may be located on the first insulating layer INS1 and the first conductive layers ML1. Each of the second vias VA2 may penetrate the second insulating layer INS2, and may be connected to the exposed first conductive layer ML1. Each of the second conductive layers ML2 may be located on the second insulating layer INS2, and may be connected to the second via VA2.

The third insulating layer INS3 may be located on the second insulating layer INS2 and the second conductive layers ML2. Each of the third vias VA3 may penetrate the third insulating layer INS3, and may be connected to the exposed second conductive layer ML2. Each of the third conductive layers ML3 may be located on the third insulating layer INS3, and may be connected to the third via VA3.

A fourth insulating layer INS4 may be located on the third insulating layer INS3 and the third conductive layers ML3. Each of the fourth vias VA4 may penetrate the fourth insulating layer INS4, and may be connected to the exposed third conductive layer ML3. Each of the fourth conductive layers ML4 may be located on the fourth insulating layer INS4, and may be connected to the fourth via VA4.

A fifth insulating layer INS5 may be located on the fourth insulating layer INS4 and the fourth conductive layers ML4. Each of the fifth vias VA5 may penetrate the fifth insulating layer INS5, and may be connected to the exposed fourth conductive layer ML4. Each of the fifth conductive layers ML5 may be located on the fifth insulating layer INS5, and may be connected to the fifth via VA5.

A sixth insulating layer INS6 may be located on the fifth insulating layer INS5 and the fifth conductive layers ML5. Each of the sixth vias VA6 may penetrate the sixth insulating layer INS6, and may be connected to the exposed fifth conductive layer ML5. Each of the sixth conductive layers ML6 may be located on the sixth insulating layer INS6, and may be connected to the sixth via VA6.

A seventh insulating layer INS7 may be located on the sixth insulating layer INS6 and the sixth conductive layers ML6. Each of the seventh vias VA7 may penetrate the seventh insulating layer INS7, and may be connected to the exposed sixth conductive layer ML6. Each of the seventh conductive layers ML7 may be located on the seventh insulating layer INS7, and may be connected to the seventh via VA7.

An eighth insulating layer INS8 may be located on the seventh insulating layer INS7 and the seventh conductive layers ML7. Each of the eighth vias VA8 may penetrate the eighth insulating layer INS8, and may be connected to the exposed seventh conductive layer ML7. Each of the eighth conductive layers ML8 may be located on the eighth insulating layer INS8, and may be connected to the eighth via VA8.

The first to eighth conductive layers ML1 to ML8 and the first to eighth vias VA1 to VA8 may be formed of substantially the same material. The first to eighth conductive layers ML1 to ML8 and the first to eighth vias VA1 to VA8 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. The first to eighth vias VA1 to VA8 may be made of substantially the same material. First to eighth insulating layers INS1 to INS8 may be formed of a silicon oxide (SiOx)-based inorganic layer, but the present disclosure is not limited thereto.

The thicknesses of the first conductive layer ML1, the second conductive layer ML2, the third conductive layer ML3, the fourth conductive layer ML4, the fifth conductive layer ML5, and the sixth conductive layer ML6 may be greater than the thicknesses of the first via VA1, the second via VA2, the third via VA3, the fourth via VA4, the fifth via VA5, and the sixth via VA6, respectively. The thickness of each of the second conductive layer ML2, the third conductive layer ML3, the fourth conductive layer ML4, the fifth conductive layer ML5, and the sixth conductive layer ML6 may be greater than the thickness of the first conductive layer ML1. The thickness of the second conductive layer ML2, the thickness of the third conductive layer ML3, the thickness of the fourth conductive layer ML4, the thickness of the fifth conductive layer ML5, and the thickness of the sixth conductive layer ML6 may be substantially the same. For example, the thickness of the first conductive layer ML1 may be approximately 1360 Å, the thickness of each of the second conductive layer ML2, the third conductive layer ML3, the fourth conductive layer ML4, the fifth conductive layer ML5, and the sixth conductive layer ML6 may be approximately 1440 Å, and the thickness of each of the first via VA1, the second via VA2, the third via VA3, the fourth via VA4, the fifth via VA5, and the sixth via VA6 may be approximately 1150 Å.

The thickness of each of the seventh conductive layer ML7 and the eighth conductive layer ML8 may be greater than the thickness of the first conductive layer ML1, the thickness of the second conductive layer ML2, the thickness of the third conductive layer ML3, the thickness of the fourth conductive layer ML4, the thickness of the fifth conductive layer ML5, and the thickness of the sixth conductive layer ML6. The thickness of the seventh conductive layer ML7 and the thickness of the eighth conductive layer ML8 may be greater than the thickness of the seventh via VA7 and the thickness of the eighth via VA8, respectively. The thickness of each of the seventh via VA7 and the eighth via VA8 may be greater than the thickness of the first via VA1, the thickness of the second via VA2, the thickness of the third via VA3, the thickness of the fourth via VA4, the thickness of the fifth via VA5, and the thickness of the sixth via VA6. The thickness of the seventh conductive layer ML7 and the thickness of the eighth conductive layer ML8 may be substantially the same. For example, the thickness of each of the seventh conductive layer ML7 and the eighth conductive layer ML8 may be approximately 9000 Å. The thickness of each of the seventh via VA7 and the eighth via VA8 may be approximately 6000 Å.

The ninth insulating layer INS9 may be located on the eighth insulating layer INS8 and the eighth conductive layer ML8. The ninth insulating layer INS9 may be formed of a silicon oxide (SiOx)-based inorganic layer, but the present disclosure is not limited thereto.

Each of the ninth vias VA9 may penetrate the ninth insulating layer INS9, and may be connected to the exposed eighth conductive layer ML8. The ninth vias VA9 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. The thickness of the ninth via VA9 may be approximately 16500 Å.

The display element layer EML may be located on the light-emitting element backplane EBP. The display element layer EML may include light-emitting elements LE each including a reflective electrode layer RL, tenth and eleventh insulating layers INS10 and INS11, a tenth via VA10, the first electrode AND, a light-emitting stack IL, and a second electrode CAT, and may also include a pixel-defining layer PDL, and a plurality of trenches TRC.

The reflective electrode layer RL may be located on the ninth insulating layer INS9. The reflective electrode layer RL may include at least one reflective electrode RL1, RL2, RL3, and RL4. For example, the reflective electrode layer RL may include first to fourth reflective electrodes RL1, RL2, RL3, and RL4 as shown in FIG. 7.

Each of the first reflective electrodes RL1 may be located on the ninth insulating layer INS9, and may be connected to the ninth via VA9. The first reflective electrodes RL1 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the first reflective electrodes RL1 may include titanium nitride (TiN).

Each of second reflective electrodes RL2 may be located on the first reflective electrode RL1. The second reflective electrodes RL2 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the second reflective electrodes RL2 may include aluminum (Al).

Each of the third reflective electrodes RL3 may be located on the second reflective electrode RL2. The third reflective electrodes RL3 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the third reflective electrodes RL3 may include titanium nitride (TiN).

The fourth reflective electrodes RL4 may be respectively located on the third reflective electrodes RL3. The fourth reflective electrodes RL4 may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the fourth reflective electrodes RL4 may include titanium (Ti).

Because the second reflective electrode RL2 is an electrode that substantially reflects light from the light-emitting elements LE, the thickness of the second reflective electrode RL2 may be greater than the thickness of each of the first reflective electrode RL1, the third reflective electrode RL3, and the fourth reflective electrode RL4. For example, the thickness of each of the first reflective electrode RL1, the third reflective electrode RL3, and the fourth reflective electrode RL4 may be approximately 100 Å, and the thickness of the second reflective electrode RL2 may be 850 Å.

The tenth insulating layer INS10 may be located on the ninth insulating layer INS9. The tenth insulating layer INS10 may be located between the reflective electrode layers RL adjacent to each other in a horizontal direction. The tenth insulating layer INS10 may be located on the reflective electrode layer RL in the third sub-pixel SP3. The tenth insulating layer INS10 may be formed of a silicon oxide (SiOx)-based inorganic layer, but the present disclosure is not limited thereto.

The eleventh insulating layer INS11 may be located on the tenth insulating layer INS10 and the reflective electrode layer RL. The eleventh insulating layer INS11 may be formed of a silicon oxide (SiOx)-based inorganic layer, but the present disclosure is not limited thereto. The tenth insulating layer INS10 and the eleventh insulating layer INS11 may be an optical auxiliary layer through which light reflected by the reflective electrode layer RL passes, among light emitted from the light-emitting elements LE.

In one or more embodiments, to match the resonance distance of the light emitted from the light-emitting elements LE in at least one of the first sub-pixel SP1, the second sub-pixel SP2, or the third sub-pixel SP3, the tenth insulating layer INS10 and the eleventh insulating layer INS11 may not be located under the first electrode AND of the first sub-pixel SP1. The first electrode AND of the first sub-pixel SP1 may be directly located on the reflective electrode layer RL. The eleventh insulating layer INS11 may be located under the first electrode AND of the second sub-pixel SP2. The tenth insulating layer INS10 and the eleventh insulating layer INS11 may be located under the first electrode AND of the third sub-pixel SP3.

In summary, the distance between the first electrode AND and the reflective electrode layer RL may be different in the first sub-pixel SP1, the second sub-pixel SP2, and the third sub-pixel SP3. That is, to adjust the distance from the reflective electrode layer RL to the second electrode CAT according to the main wavelength of the light emitted from each of the first sub-pixel SP1, the second sub-pixel SP2, and the third sub-pixel SP3, the presence or absence of the tenth insulating layer INS10 and the eleventh insulating layer INS11 may be set in each of the first sub-pixel SP1, the second sub-pixel SP2, and the third sub-pixel SP3. For example, it is illustrated in FIG. 7 that the distance between the first electrode AND and the reflective electrode layer RL in the third sub-pixel SP3 is greater than the distance between the first electrode AND and the reflective electrode layer RL in the second sub-pixel SP2, and is greater than the distance between the first electrode AND and the reflective electrode layer RL in the first sub-pixel SP1, and it is also illustrated that the distance between the first electrode AND and the reflective electrode layer RL in the second sub-pixel SP2 is greater than the distance between the first electrode AND and the reflective electrode layer RL in the first sub-pixel SP1, but the specification of the present disclosure is not limited thereto.

In addition, although the tenth insulating layer INS10 and the eleventh insulating layer INS11 are illustrated, a twelfth insulating layer located under the first electrode AND of the first sub-pixel SP1 may be added. In this case, the eleventh insulating layer INS11 and the twelfth insulating layer may be located under the first electrode AND of the second sub-pixel SP2, and the tenth insulating layer INS10, the eleventh insulating layer INS11, and the twelfth insulating layer may be located under the first electrode AND of the third sub-pixel SP3.

Each of the tenth vias VA10 may penetrate the tenth insulating layer INS10 and/or the eleventh insulating layer INS11 in the second sub-pixel SP2 and in the third sub-pixel SP3, and may be connected to the exposed reflective layer RL. The tenth vias VA10 may be formed of any one of copper (Cu), aluminum (AI), tungsten (W), molybdenum (Mo), chromium (Cr), gold (Au), titanium (Ti), nickel (Ni), or neodymium (Nd), or an alloy including any one of them. The thickness of the tenth via VA10 in the second sub-pixel SP2 may be less than the thickness of the tenth via VA10 in the third sub-pixel SP3.

The first electrode AND of each of the light-emitting elements LE may be located on the tenth insulating layer INS10, and may be connected to the tenth via VA10. The first electrode AND of each of the light-emitting elements LE may be connected to the drain region DA or source region SA of the pixel transistor PTR through the tenth via VA10, the first to fourth reflective electrodes RL1 to RL4, the first to ninth vias VA1 to VA9, the first to eighth conductive layers ML1 to ML8, and the contact terminal CTE. The first electrode AND of each of the light-emitting elements LE may be formed of any one of copper (Cu), aluminum (Al), tungsten (W), molybdenum (Mo), chromium (Cr), gold (Au), titanium (Ti), nickel (Ni), or neodymium (Nd), or an alloy including any one of them. For example, the first electrode AND of each of the light-emitting elements LE may be titanium nitride (TiN).

The pixel-defining layer PDL may be located on a part of the first electrode AND of each of the light-emitting elements LE. The pixel-defining layer PDL may cover the edge of the first electrode AND of each of the light-emitting elements LE. The pixel-defining layer PDL may serve to partition the first emission areas EA1, the second emission areas EA2, and the third emission areas EA3.

The first emission area EA1 may be defined as an area in which the first electrode AND, the light-emitting stack IL, and the second electrode CAT are sequentially stacked in the first sub-pixel SP1 to emit light. The second emission area EA2 may be defined as an area in which the first electrode AND, the light-emitting stack IL, and the second electrode CAT are sequentially stacked in the second sub-pixel SP2 to emit light. The third emission area EA3 may be defined as an area in which the first electrode AND, the light-emitting stack IL, and the second electrode CAT are sequentially stacked in the third sub-pixel SP3 to emit light.

The pixel-defining layer PDL may include first to third pixel-defining layers PDL1, PDL2, and PDL3. The first pixel-defining layer PDL1 may be located on the edge of the first electrode AND of each of the light-emitting elements LE, the second pixel-defining layer PDL2 may be located on the first pixel-defining layer PDL1, and the third pixel-defining layer PDL3 may be located on the second pixel-defining layer PDL2. The first pixel-defining layer PDL1, the second pixel-defining layer PDL2, and the third pixel-defining layer PDL3 may be formed of a silicon oxide (SiOx)-based inorganic layer, but the present disclosure is not limited thereto. The first pixel-defining layer PDL1, the second pixel-defining layer PDL2, and the third pixel-defining layer PDL3 may each have a thickness of about 500 Å.

When the first pixel-defining layer PDL1, the second pixel-defining layer PDL2, and the third pixel-defining layer PDL3 are formed as one pixel-defining layer, the height of the one pixel-defining layer increases, so that a first encapsulation inorganic layer TFE1 may be cut off due to step coverage. Step coverage refers to the ratio of the degree of thin film coated on an inclined portion to the degree of thin film coated on a flat portion. The lower the step coverage, the more likely it is that the thin film will be cut off at inclined portions.

Therefore, to reduce or prevent the likelihood of the first encapsulation inorganic layer TFE1 being cut off due to the step coverage, the first pixel-defining layer PDL1, the second pixel-defining layer PDL2, and the third pixel-defining layer PDL3 may have a cross-sectional structure having a stepped portion. For example, the width of the first pixel-defining layer PDL1 may be greater than the width of the second pixel-defining layer PDL2 and greater than the width of the third pixel-defining layer PDL3. The width of the second pixel-defining layer PDL2 may be greater than the width of the third pixel-defining layer PDL3. The width of the first pixel-defining layer PDL1 refers to the horizontal length of the first pixel-defining layer PDL1 defined in the first direction DR1 and/or the second direction DR2.

Each of the plurality of trenches TRC may penetrate the first pixel-defining layer PDL1, the second pixel-defining layer PDL2, and the third pixel-defining layer PDL3. Furthermore, each of the plurality of trenches TRC may penetrate the eleventh insulating layer INS11. The tenth insulating layer INS10 may be partially recessed at each of the plurality of trenches TRC.

At least one trench TRC may be located between adjacent sub-pixels SP1, SP2, and SP3. Although FIG. 7 illustrates that two trenches TRC are located between adjacent sub-pixels SP1, SP2, and SP3, the present disclosure is not limited thereto.

The light-emitting stack IL may include a plurality of intermediate layers. FIG. 7 illustrates that the light-emitting stack IL has a three-tandem structure including the first stack layer IL1, the second stack layer IL2, and the third stack layer IL3, but the present disclosure is not limited thereto. For example, the light-emitting stack IL may have a two-tandem structure including two intermediate layers.

In the three-tandem structure, the light-emitting stack IL may have a tandem structure including a plurality of stack layers IL1, IL2, and IL3 that emit different lights. For example, the light-emitting stack IL may include the first stack layer IL1 that emits light of the first color, the second stack layer IL2 that emits light of the third color, and the third stack layer IL3 that emits light of the second color. The first stack layer IL1, the second stack layer IL2, and the third stack layer IL3 may be sequentially stacked.

The first stack layer IL1 may have a structure in which a first hole transport layer, a first organic light-emitting layer that emits light of the first color, and a first electron transport layer are sequentially stacked. The second stack layer IL2 may have a structure in which a second hole transport layer, a second organic light-emitting layer that emits light of the third color, and a second electron transport layer are sequentially stacked. The third stack layer IL3 may have a structure in which a third hole transport layer, a third organic light-emitting layer that emits light of the second color, and a third electron transport layer are sequentially stacked.

A first charge generation layer for supplying charges to the second stack layer IL2, and for supplying electrons to the first stack layer IL1 may be located between the first stack layer IL1 and the second stack layer IL2. The first charge generation layer may include an N-type charge generation layer that supplies electrons to the first stack layer IL1, and a P-type charge generation layer that supplies holes to the second stack layer IL2. The N-type charge generation layer may include a dopant of a metal material.

A second charge generation layer for supplying charges to the third stack layer IL3, and for supplying electrons to the second stack layer IL2 may be located between the second stack layer IL2 and the third stack layer IL3. The second charge generation layer may include an N-type charge generation layer that supplies electrons to the second stack layer IL2 and a P-type charge generation layer that supplies holes to the third stack layer IL3.

The first stack layer IL1 may be located on the first electrodes AND and the pixel-defining layer PDL, and may be located on the bottom surface of each trench TRC. Due to the trench TRC, the first stack layer IL1 may be cut off between adjacent sub-pixels SP1, SP2, and SP3. The second stack layer IL2 may be located on the first stack layer IL1. Due to the trench TRC, the second stack layer IL2 may be cut off between adjacent sub-pixels SP1, SP2, and SP3. A cavity ESS or an empty space may be located between the first stack layer IL1 and the second stack layer IL2. The third stack layer IL3 may be located on the second stack layer IL2. The third stack layer IL3 is not cut off by the trench TRC, and may cover the second stack layer IL2 in each of the trenches TRC. That is, in the three-tandem structure, each of the plurality of trenches TRC may be a structure for cutting off the first to second stack layers IL1 and IL2, the first charge generation layer, and the second charge generation layer of the display element layer EML between the sub-pixels SP1, SP2, and SP3 adjacent to each other. In addition, in the two-tandem structure, each of the trenches TRC may be a structure for cutting off the charge generation layer located between a lower intermediate layer and an upper intermediate layer, and the lower intermediate layer.

To stably cut off the first and second stack layers IL1 and IL2 of the display element layer EML between adjacent sub-pixels SP1, SP2, and SP3, the height of each of the plurality of trenches TRC may be greater than the height of the pixel-defining layer PDL. The height of each of the plurality of trenches TRC refers to the length of each of the plurality of trenches TRC in the third direction DR3. The height of the pixel-defining layer PDL refers to the length of the pixel-defining layer PDL in the third direction DR3. To cut off the first to third stack layers IL1, IL2, and IL3 of the display element layer EML between the neighboring sub-pixels SP1, SP2, and SP3, another structure may exist instead of the trench TRC. For example, instead of the trench TRC, a reverse tapered partition wall may be located on the pixel-defining layer PDL.

The number of the stack layers IL1, IL2, and IL3 that emit different lights is not limited to that shown in FIG. 7. For example, the light-emitting stack IL may include two intermediate layers. In this case, one of the two intermediate layers may be substantially the same as the first stack layer IL1, and the other may include a second hole transport layer, a second organic light-emitting layer, a third organic light-emitting layer, and a second electron transport layer. In this case, a charge generation layer for supplying electrons to one intermediate layer, and for supplying charges to the other intermediate layer may be located between the two intermediate layers.

In addition, FIG. 7 illustrates that the first to third stack layers IL1, IL2, and IL3 are all located in the first emission area EA1, the second emission area EA2, and the third emission area EA3, but the present disclosure is not limited thereto. For example, the first stack layer IL1 may be located in the first emission area EA1, and may not be located in the second emission area EA2 and the third emission area EA3. Furthermore, the second stack layer IL2 may be located in the second emission area EA2 and may not be located in the first emission area EA1 and the third emission area EA3. Further, the third stack layer IL3 may be located in the third emission area EA3 and may not be located in the first emission area EA1 and the second emission area EA2. In this case, first to third color filters CF1, CF2, and CF3 of the optical layer OPL may be omitted.

The second electrode CAT may be located on the third stack layer IL3. The second electrode CAT may be located on the third stack layer IL3 in each of the plurality of trenches TRC. The second electrode CAT may be formed of a transparent conductive material (TCO), such as ITO or IZO that can transmit light or a semi-transmissive conductive material, such as magnesium (Mg), silver (Ag), or an alloy of Mg and Ag. When the second electrode CAT is formed of a semi-transmissive conductive material, the light emission efficiency may be improved in each of the first to third sub-pixels SP1, SP2, and SP3 due to a micro-cavity effect.

The encapsulation layer TFE may be located on the display element layer EML. The encapsulation layer TFE may include at least one inorganic layer TFE1 and TFE2 to reduce or prevent oxygen or moisture permeating into the display element layer EML. For example, the encapsulation layer TFE may include the first encapsulation inorganic layer TFE1, and a second encapsulation inorganic layer TFE2.

The first encapsulation inorganic layer TFE1 may be located on the second electrode CAT. The first encapsulation inorganic layer TFE1 may be formed as a multilayer in which one or more inorganic layers selected from silicon nitride (SiNx), silicon oxy nitride (SiON), or silicon oxide (SiOx) are alternately stacked. The first encapsulation inorganic layer TFE1 may be formed by a chemical vapor deposition (CVD) process.

The second encapsulation inorganic layer TFE2 may be located on the first encapsulation inorganic layer TFE1. The second encapsulation inorganic layer TFE2 may be formed of titanium oxide (TiOx) or aluminum oxide (AlOx), but one or more embodiments of the present specification is not limited thereto. The second encapsulation inorganic layer TFE2 may be formed by an atomic layer deposition (ALD) process. The thickness of the second encapsulation inorganic layer TFE2 may be less than the thickness of the first encapsulation inorganic layer TFE1.

An organic layer APL may be a layer for increasing the interfacial adhesion between the encapsulation layer TFE and the optical layer OPL. The organic layer APL may be an organic layer, such as acrylic resin, epoxy resin, phenolic resin, polyamide resin, or polyimide resin.

The optical layer OPL includes a plurality of color filters CF1, CF2, and CF3, a plurality of lenses LNS, and a filling layer FIL. The plurality of color filters CF1, CF2, and CF3 may include the first to third color filters CF1, CF2, and CF3. The first to third color filters CF1, CF2, and CF3 may be located on the adhesive layer ADL.

The first color filter CF1 may overlap the first emission area EA1 of the first sub-pixel SP1. The first color filter CF1 may transmit light of the first color (e.g., light of a blue wavelength band). The blue wavelength band may be approximately 370 nm to 460 nm. Thus, the first color filter CF1 may transmit light of the first color among light emitted from the first emission area EA1.

The second color filter CF2 may overlap the second emission area EA2 of the second sub-pixel SP2. The second color filter CF2 may transmit light of the second color (e.g., light of a green wavelength band). The green wavelength band may be approximately 480 nm to 560 nm. Thus, the second color filter CF2 may transmit light of the second color among light emitted from the second emission area EA2.

The third color filter CF3 may overlap the third emission area EA3 of the third sub-pixel SP3. The third color filter CF3 may transmit light of the third color (e.g., light of a red wavelength band). The red wavelength band may be approximately 600 nm to 750 nm. Thus, the third color filter CF3 may transmit light of the third color among light emitted from the third emission area EA3.

The plurality of lenses LNS may be located on the first color filter CF1, the second color filter CF2, and the third color filter CF3, respectively. Each of the plurality of lenses LNS may be a structure for increasing a ratio of light directed to the front of the display device 10. Each of the plurality of lenses LNS may have a cross-sectional shape that is convex in an upward direction.

The filling layer FIL may be located on the plurality of lenses LNS. The filling layer FIL may have a refractive index (e.g., predetermined refractive index) such that light travels in the third direction DR3 at an interface between the filling layer FIL and the plurality of lenses LNS. Further, the filling layer FIL may be a planarization layer. The filling layer FIL may be an organic layer, such as acrylic resin, epoxy resin, phenolic resin, polyamide resin, or polyimide resin.

The cover layer CVL may be located on the filling layer FIL. The cover layer CVL may be a glass substrate or a polymer resin. When the cover layer CVL is a glass substrate, it may be attached onto the filling layer FIL. In this case, the filling layer FIL may serve to bond the cover layer CVL. When the cover layer CVL is a glass substrate, it may serve as an encapsulation substrate. When the cover layer CVL is a polymer resin, it may be directly applied onto the filling layer FIL.

The polarizing plate may be located on one surface of the cover layer CVL. The polarizing plate may be a structure for reducing or preventing visibility degradation caused by reflection of external light. The polarizing plate may include a linear polarizing plate and a phase retardation film. For example, the phase retardation film may be a λ/4 plate (quarter-wave plate), but the present disclosure is not limited thereto. However, when visibility degradation caused by reflection of external light is sufficiently overcome by the first to third color filters CF1, CF2, and CF3, the polarizing plate may be omitted.

Figure 8:
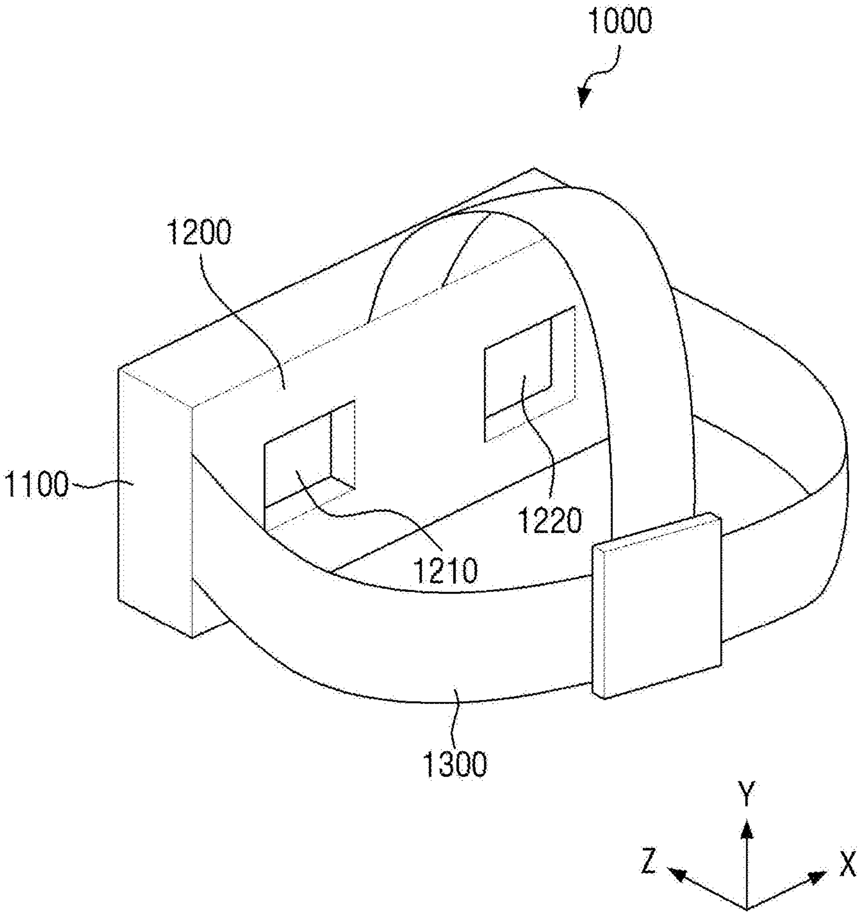
FIG. 8 is a perspective view illustrating a head-mounted display according to one or more embodiments.
Figure 9:
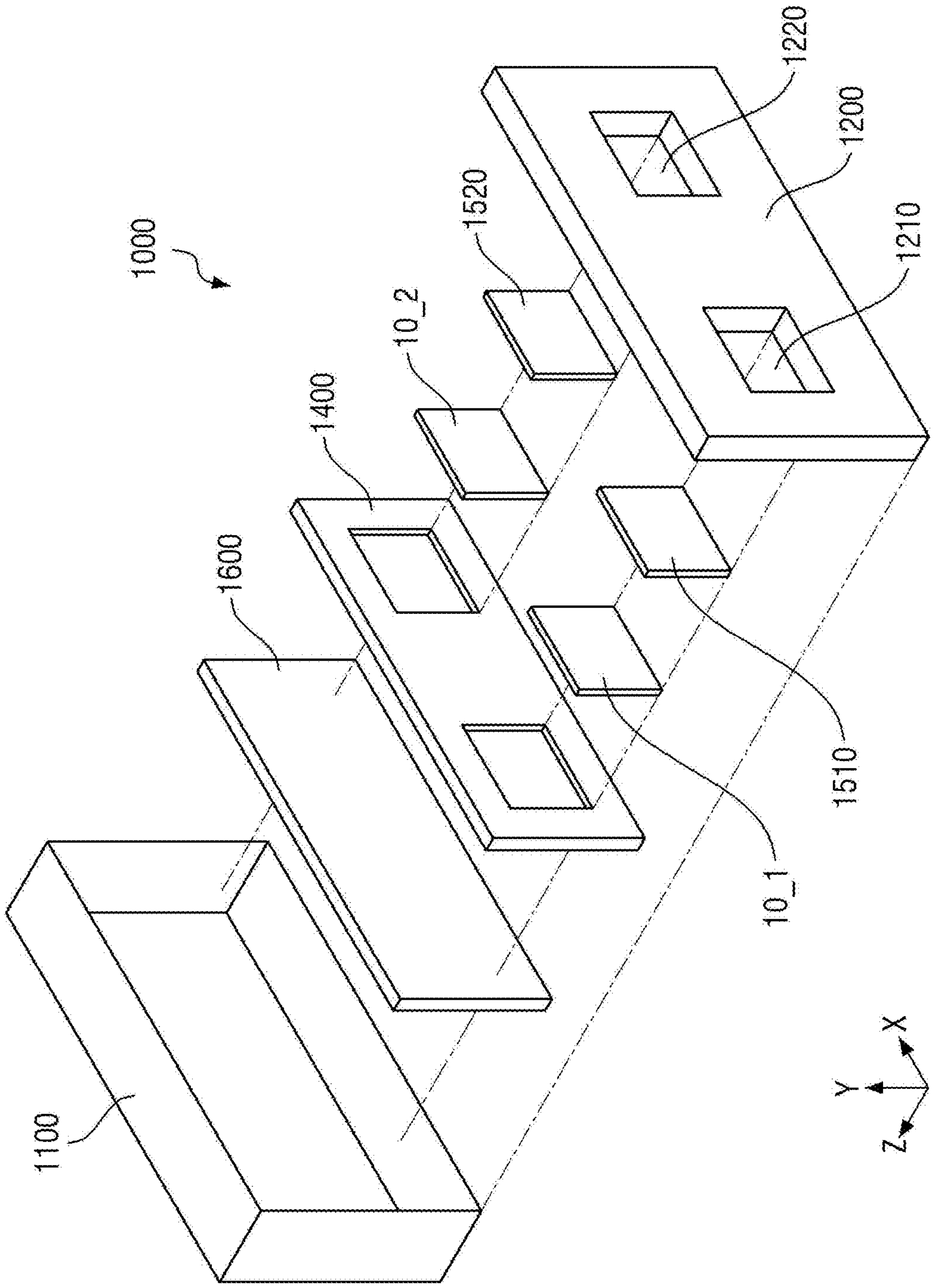
FIG. 9 is an exploded perspective view illustrating an example of the head-mounted display of FIG. 8.

FIG. 8 is a perspective view illustrating a head-mounted display according to one or more embodiments. FIG. 9 is an exploded perspective view illustrating an example of the head-mounted display of FIG. 8.

Referring to FIGS. 8 and 9, a head-mounted display 1000 according to one or more embodiments includes a first display device 10_1, a second display device 10_2, a display device housing 1100, a housing cover 1200, a first eyepiece 1210, a second eyepiece 1220, a head-mounted band 1300, a middle frame 1400, a first optical member 1510, a second optical member 1520, and a control circuit board 1600.

The first display device 10_1 provides an image to the user's left eye, and the second display device 10_2 provides an image to the user's right eye. Because each of the first display device 10_1 and the second display device 10_2 is substantially the same as the display device 10 described in conjunction with FIGS. 1 and 2, a description of the first display device 10_1 and the second display device 10_2 will be omitted.

The first optical member 1510 may be located between the first display device 10_1 and the first eyepiece 1210. The second optical member 1520 may be located between the second display device 10_2 and the second eyepiece 1220. Each of the first optical member 1510 and the second optical member 1520 may include at least one convex lens.

The middle frame 1400 may be located between the first display device 10_1 and the control circuit board 1600 and between the second display device 10_2 and the control circuit board 1600. The middle frame 1400 serves to support and fix the first display device 10_1, the second display device 10_2, and the control circuit board 1600.

The control circuit board 1600 may be located between the middle frame 1400 and the display device housing 1100. The control circuit board 1600 may be connected to the first display device 10_1 and the second display device 10_2 through the connector. The control circuit board 1600 may convert an image source inputted from the outside into digital video data DATA, and may transmit the digital video data DATA to the first display device 10_1 and the second display device 10_2 through the connector.

The control circuit board 1600 may transmit the digital video data DATA corresponding to a left-eye image optimized for the user's left eye to the first display device 10_1, and may transmit the digital video data DATA corresponding to a right-eye image optimized for the user's right eye to the second display device 10_2. Alternatively, the control circuit board 1600 may transmit the same digital video data DATA to the first display device 10_1 and the second display device 10_2.

The display device housing 1100 serves to accommodate the first display device 10_1, the second display device 10_2, the middle frame 1400, the first optical member 1510, the second optical member 1520, and the control circuit board 1600. The housing cover 1200 covers one open surface of the display device housing 1100. The housing cover 1200 may include the first eyepiece 1210 at which the user's left eye is located and the second eyepiece 1220 at which the user's right eye is located. FIGS. 8 and 9 illustrate that the first eyepiece 1210 and the second eyepiece 1220 are separate, but the present disclosure is not limited thereto. The first eyepiece 1210 and the second eyepiece 1220 may be combined into one.

The first eyepiece 1210 may be aligned with the first display device 10_1 and the first optical member 1510, and the second eyepiece 1220 may be aligned with the second display device 10_2 and the second optical member 1520. Therefore, the user may view, through the first eyepiece 1210, the image of the first display device 10_1 magnified as a virtual image by the first optical member 1510, and may view, through the second eyepiece 1220, the image of the second display device 10_2 magnified as a virtual image by the second optical member 1520.

The head-mounted band 1300 serves to secure the display device housing 1100 to the user's head such that the first eyepiece 1210 and the second eyepiece 1220 of the housing cover 1200 remain located on, or aligned with, the user's left and right eyes, respectively. When the display device housing 1200 is implemented to be lightweight and compact, the head-mounted display 1000 may be provided with, as shown in FIG. 10, an eyeglass frame instead of the head-mounted band 1300.

In addition, the head-mounted display 1000 may further include a battery for supplying power, an external memory slot for accommodating an external memory, and an external connection port and a wireless communication module for receiving an image source. The external connection port may be a universe serial bus (USB) terminal, a display port, or a high-definition multimedia interface (HDMI) terminal, and the wireless communication module may be a 5G communication module, a 4G communication module, a Wi-Fi® module, or a Bluetooth® module (Wi-Fi® being a registered trademark of the non-profit Wi-Fi Alliance, and Bluetooth® being a registered trademark of Bluetooth Sig, Inc., Kirkland, WA).

Figure 10:
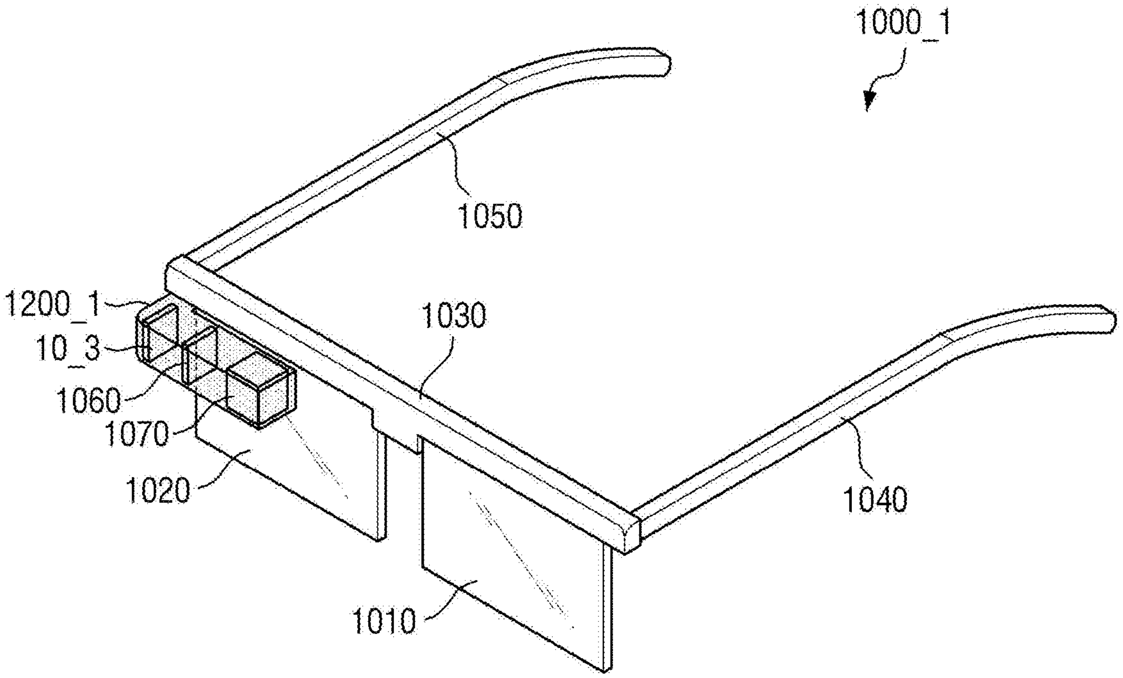
FIG. 10 is a perspective view illustrating a head-mounted display according to one or more embodiments.

FIG. 10 is a perspective view illustrating a head-mounted display according to one or more embodiments.

Referring to FIG. 10, a head-mounted display 1000_1 according to one or more embodiments may be an eyeglasses-type display device in which a display device housing 1200_1 is implemented in a relatively lightweight and compact manner. The head-mounted display 1000_1 according to one or more embodiments may include a display device 10_3, a left eye lens 1010, a right eye lens 1020, a support frame 1030, temples 1040 and 1050, an optical member 1060, an optical path changing member 1070, and the display device housing 1200_1.

The display device housing 1200_1 may include the display device 10_3, the optical member 1060, and the optical path changing member 1070. The image displayed on the display device 10_3 may be magnified by the optical member 1060, and may be provided to the user's right eye through the right eye lens 1020 after the optical path thereof is changed by the optical path changing member 1070. As a result, the user may view an augmented reality image, through the right eye, in which a virtual image displayed on the display device 10_3 and a real image seen through the right eye lens 1020 are combined.

FIG. 10 illustrates that the display device housing 1200_1 is located at the right end of the support frame 1030, but the present disclosure is not limited thereto. For example, the display device housing 1200_1 may be located at the left end of the support frame 1030, and in this case, the image of the display device 10_3 may be provided to the user's left eye. Alternatively, the display device housing 1200_1 may be located at both the left and right ends of the support frame 1030, and in this case, the user may view the image displayed on the display device 10_3 through both the left and right eyes.

Figure 11:
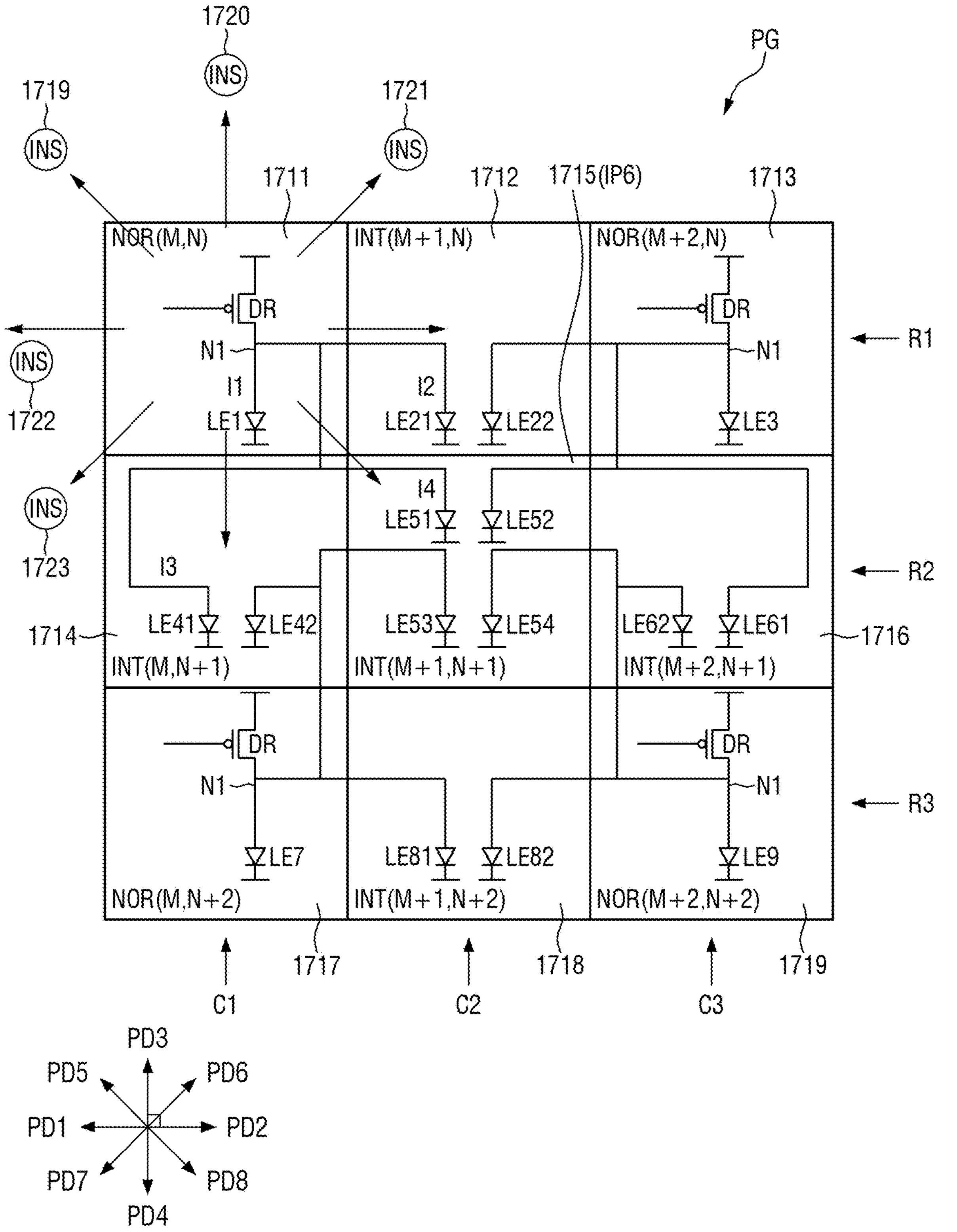
FIG. 11 is a diagram schematically showing the arrangement of pixels of the display panel according to one or more embodiments.

FIG. 11 is a diagram schematically showing the arrangement of pixels of the display panel 100 according to one or more embodiments.

Table 1 schematically shows the arrangement of pixels of the display panel 100 according to one or more embodiments. For example, Table 1 shows the arrangement of a normal pixel NP and of interpolation pixels included in a single pixel group.

TABLE 1

| | | |
|---|---|---|
| Fifth interpolation pixel IP5 (hereinafter referred to as IP5) | Third interpolation pixel IP3 (hereinafter referred to as IP3) | Sixth interpolation pixel IP6 (hereinafter referred to as IP6) |
| First interpolation pixel IP1 (hereinafter referred to as IP1) | Normal pixel NP (hereinafter referred to as NP) | Second interpolation pixel IP2 (hereinafter referred to as IP2) |
| Seventh interpolation pixel IP7 (hereinafter referred to as IP7) | Fourth interpolation pixel IP4 (hereinafter referred to as IP4) | Eight interpolation pixel IP8 (hereinafter referred to as IP8) |

Referring to Table 1 and FIG. 11, in the display panel 100 according to one or more embodiments, one normal pixel NP, and a plurality of interpolation pixels surrounding the one normal pixel NP, form one pixel group. The one normal pixel NP includes a driving transistor DR and a normal light-emitting element (e.g., LE1, LE3, LE7, and LE9 of FIG. 11) that receives a driving current through the first node N1 connected to the drain electrode of the driving transistor DR. The normal light-emitting element (e.g., LE1, LE3, LE7, and LE9 of FIG. 11) may include a normal emission pattern (e.g., EP1, EP3, EP7, and EP9 of FIG. 13). In the present disclosure, the normal emission pattern refers to an area in which the normal light-emitting element emits light, and may be referred to as a "normal emission area."

Each of a plurality of interpolation pixels IP1 to IP8 includes a first interpolation light-emitting element (e.g., LE21 in FIG. 11) that receives a part of a first driving current from a first normal pixel, and a second interpolation light-emitting element (e.g., LE22 in FIG. 11) that receives a part of a second driving current from a second normal pixel. With respect to each of the plurality of interpolation pixels IP1 to IP8, the first normal pixel may mean the normal pixel NP located in one direction. With respect to each of the plurality of interpolation pixels IP1 to IP8, the second normal pixel may mean the normal pixel NP located in another direction.

A first interpolation emission pattern of the first interpolation light-emitting element is located adjacent to the second normal pixel, and a second interpolation emission pattern of the second interpolation light-emitting element is located adjacent to the first normal pixel. In the present disclosure, the interpolation emission pattern refers to an area in which the interpolation light-emitting element emits light, and may be referred to as an "interpolation emission area."

Referring to Table 1, the one pixel group includes the normal pixel NP located at the center of this pixel group, the first interpolation pixel IP1 located in a first plane direction PD1 (e.g., left in Table 1) from the normal pixel NP, the second interpolation pixel IP2 located in a second plane direction PD2 (e.g., right in Table 1) opposite to the first plane direction PD1 from the normal pixel NP, a third interpolation pixel IP3 located in a third plane direction PD3 (e.g., top in Table 1) perpendicular to the first plane direction PD1 from the normal pixel NP, a fourth interpolation pixel IP4 located in a fourth plane direction PD4 (e.g., bottom in Table 1) opposite to the third plane direction PD3 from the normal pixel NP, a fifth interpolation pixel IP5 located in a first diagonal direction PD5 (e.g., diagonally top left in Table 1) between the first plane direction PD1 and the third plane direction PD3 from the normal pixel NP, a sixth interpolation pixel IP6 located in a second diagonal direction PD6 (e.g., diagonally top right in Table 1) between the second plane direction PD2 and the third plane direction PD3 from the normal pixel NP, a seventh interpolation pixel IP7 located in a third diagonal direction PD7 (e.g., diagonally bottom left in Table 1) opposite to the second diagonal direction PD6 from the normal pixel NP, and an eighth interpolation pixel IP8 located in a fourth diagonal direction PD8 (e.g., diagonally bottom right in Table 1) opposite to the first diagonal direction PD5 from the normal pixel NP.

FIG. 11 illustrates normal pixels 1711, 1713, 1717, and 1719 and interpolation pixels 1712, 1714, 1716, and 1718 located around the sixth interpolation pixel IP6 of N+1 row and M+1 column.

In FIG. 11, 1711 is the normal pixel NP in the N row and M column, which is located in the first diagonal direction PD5 from the sixth interpolation pixel IP6, and is provided with the normal light-emitting element LE1.

In FIG. 11, 1712 is the first interpolation pixel IP1 in the N row and M+1 column, which is located in the third plane direction PD3 from the sixth interpolation pixel IP6, and is provided with the interpolation light-emitting elements LE21 and LE22.

In FIG. 11, 1713 is the normal pixel NP in the N row and M+2 column, which is located in the second diagonal direction PD6 from the sixth interpolation pixel IP6, and is provided with the normal light-emitting element LE3.

In FIG. 11, 1714 is the third interpolation pixel IP3 in the N+1 row and M column, which is located in the first plane direction PD1 from the sixth interpolation pixel IP6, and is provided with interpolation light-emitting elements LE41 and LE42.

In FIG. 11, 1716 is the third interpolation pixel IP3 in the N+1 row and M+2 column, which is located in the second plane direction PD2 from the sixth interpolation pixel IP6, and is provided with interpolation light-emitting elements LE61 and LE62.

In FIG. 11, 1717 is the normal pixel NP in the N+2 row and M column, which is located in the third diagonal direction PD7 from the sixth interpolation pixel IP6, and is provided with the normal light-emitting element LE7.

In FIG. 11, 1718 is the second interpolation pixel IP2 in the N+2 row and M+1 column, which is located in the fourth plane direction PD4 from the sixth interpolation pixel IP6, and is provided with interpolation light-emitting elements LE81 and LE82.

In FIG. 11, 1719 is the normal pixel NP in the N+2 row and M+2 column, which is located in the fourth diagonal direction PD8 from the sixth interpolation pixel IP6, and is provided with the normal light-emitting element LE9.

Referring to FIG. 11, the one normal pixel NP may supply a driving current to the eight interpolation pixels IP1 to IP8 located around it. For example, the normal pixel 1711 may supply a driving current to the interpolation pixels 1722, 1723, 1714, 1715, 1712, 1721, 1720, and 1719 located around it. Likewise, the normal pixel 1713 may supply a driving current to the interpolation pixels 1712, 1715, 1716, and the like located around it.

According to one or more embodiments, the first to eighth interpolation pixels IP1 to IP8 belonging to the one pixel group may be divided into two groups as follows.

First, the first group includes the interpolation pixels IP1, IP2, IP3, and IP4 respectively located to the left, the right, above, and below the normal pixel NP around the normal pixel NP, respectively. For example, the first group includes the first to fourth interpolation pixels IP1 to IP4 located in the first to fourth plane directions PD1 to PD4 from the normal pixel NP, respectively. In addition, the second group includes the interpolation pixels IP5 to IP8 respectively located around the normal pixel NP in the four diagonal directions of the normal pixel NP. For example, the second group includes the fifth to eighth interpolation pixels IP5 to IP8 located in the first to fourth diagonal directions PD5 to PD8 from the normal pixel NP, respectively.

Each of the first to fourth interpolation pixels IP1 to IP4 belonging to the first group includes a pair of interpolation light-emitting elements (e.g., LE21 and LE22) that receive a part of the first driving current from the first normal pixel (e.g., 1711) and receive a part of the second driving current from the second normal pixel (e.g., 1713). For example, the interpolation pixel 1712 located between the normal pixel 1711 and the normal pixel 1713 may include the interpolation light-emitting elements LE21 and LE22 that respectively receive the driving current from the both the normal pixel 1711 and the normal pixel 1713, and that emit light according to the received driving current.

Each of the fifth to eighth interpolation pixels IP5 to IP8 belonging to the second group includes two pairs of interpolation light-emitting elements (e.g., LE51, LE52, LE53, and LE54) that receive a part of the first driving current from the first normal pixel (e.g., 1711), a part of the second driving current from the second normal pixel (e.g., 1713), a part of a third driving current from a third normal pixel (e.g., 1717), and a part of a fourth driving current from a fourth normal pixel (e.g., 1719). For example, the sixth interpolation pixel IP6 illustrated in FIG. 11 may include the interpolation light-emitting elements LE51, LE52, LE53, and LE54 that respectively receive the driving current from the normal pixels 1711, 1713, 1717, and 1719, and that emit light according to the received driving current.

Figure 12:
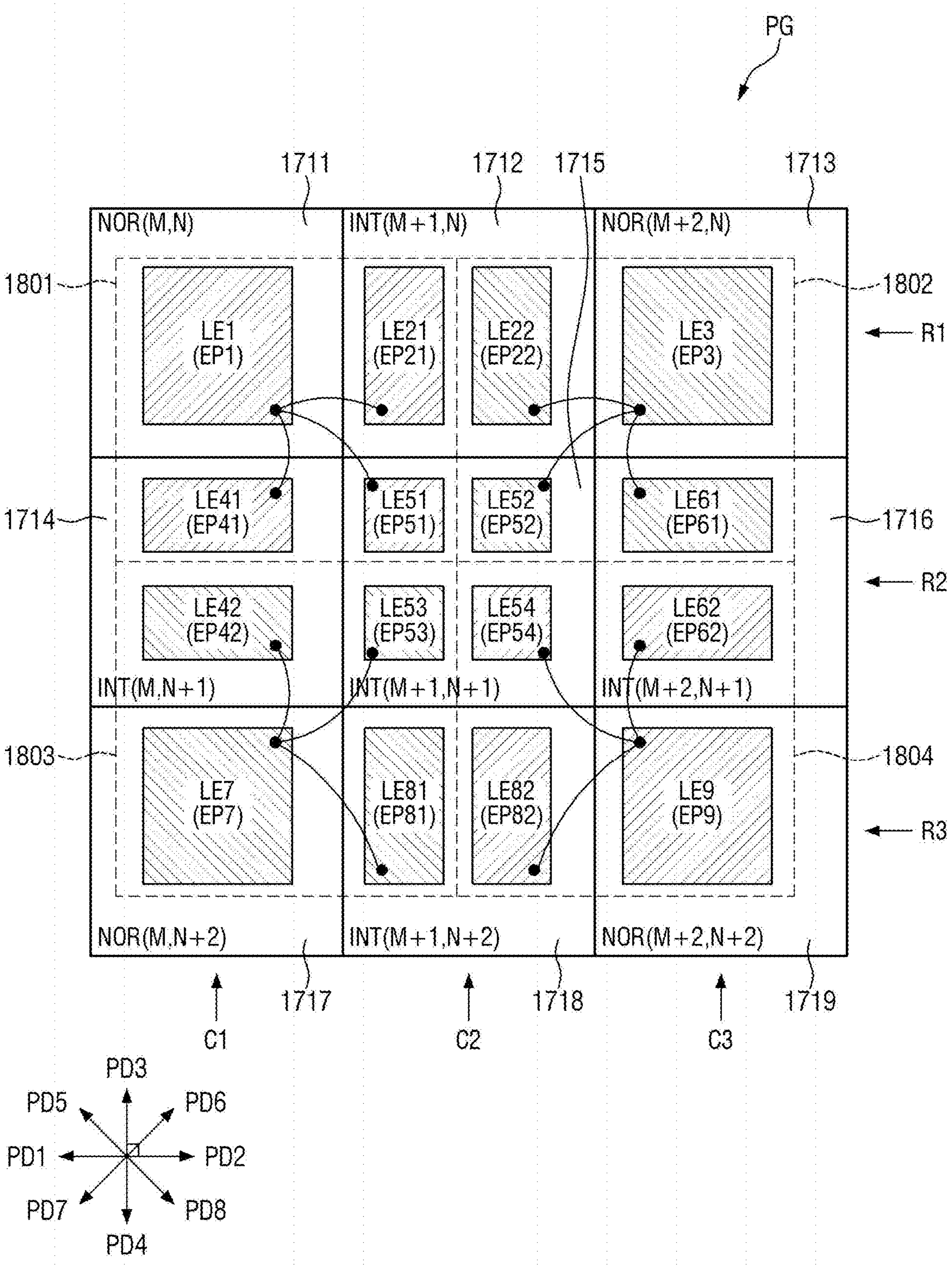
FIG. 12 is a layout diagram showing an emission pattern of pixels according to a comparative example.

FIG. 12 is a layout diagram showing an emission pattern of pixels according to a comparative example.

Referring to FIG. 12, the pixels according to the comparative example may include a light-emitting element and an emission pattern as follows.

The normal pixel 1711 includes the normal light-emitting element LE1, which includes the normal emission pattern EP1. The normal emission pattern EP1 is connected to the interpolation emission patterns of the interpolation pixels 1712, 1714, 1715, and the like.

The interpolation pixel 1712 includes the interpolation light-emitting elements LE21 and LE21, which include interpolation emission patterns EP21 and EP22, respectively. The interpolation emission pattern EP21 is connected to the normal emission pattern EP1, and the interpolation emission pattern EP22 is connected to the normal emission pattern EP3 of the normal pixel 1713.

The normal pixel 1713 includes the normal light-emitting element LE3, which includes the normal emission pattern EP3. The normal emission pattern EP3 is connected to interpolation emission patterns of the interpolation pixels 1712, 1715, 1716, and the like.

The interpolation pixel 1714 includes the interpolation light-emitting elements LE41 and LE42, and they include interpolation emission patterns EP41 and EP42, respectively. The interpolation emission pattern EP41 is connected to the normal emission pattern EP1, and the interpolation emission pattern EP42 is connected to the normal emission pattern EP7 of the normal pixel 1717.

The interpolation pixel 1715 includes the interpolation light-emitting elements LE51, LE52, LE53, and LE54, and they include interpolation emission patterns EP51, EP52, EP53, and EP54, respectively. The interpolation emission pattern EP51 is connected to the normal emission pattern EP1, the interpolation emission pattern EP52 is connected to the normal emission pattern EP3 of the normal pixel 1713, the interpolation emission pattern EP53 is connected to the normal emission pattern EP7 of the normal pixel 1717, and the interpolation emission pattern EP54 is connected to the normal emission pattern EP9 of the normal pixel 1719.

The interpolation pixel 1716 includes the interpolation light-emitting elements LE61 and LE62, and they include interpolation emission patterns EP61 and EP62, respectively. The interpolation emission pattern EP61 is connected to the normal emission pattern EP3, and the interpolation emission pattern EP62 is connected to the normal emission pattern EP9 of the normal pixel 1719.

The normal pixel 1717 includes the normal light-emitting element LE7, which includes the normal emission pattern EP7. The normal emission pattern EP7 is connected to the interpolation emission patterns of the interpolation pixels 1714, 1715, 1718, and the like.

The interpolation pixel 1718 includes the interpolation light-emitting elements LE81 and LE82, and they include interpolation emission patterns EP81 and EP82, respectively. The interpolation emission pattern EP81 is connected to the normal emission pattern EP7, and the interpolation emission pattern EP82 is connected to the normal emission pattern EP9 of the normal pixel 1719.

The normal pixel 1717 includes the normal light-emitting element LE9, which includes the normal emission pattern EP9. The normal emission pattern EP9 is connected to the interpolation emission patterns of the interpolation pixels 1715, 1716, 1718, and the like.

In the light emission pattern of the pixels according to the comparative example, the first normal emission pattern (e.g., EP1) of the normal pixel NP providing the first driving current and the first interpolation emission pattern (e.g., EP21) receiving the first driving current are located adjacent to each other. For example, the normal light-emitting element LE1 of the normal pixel 1711 supplies a driving current to the interpolation light-emitting element LE21 of the interpolation pixel 1712. The interpolation emission pattern EP21 of the interpolation light-emitting element LE21 is located adjacent to the normal emission pattern EP1 of the normal light-emitting element LE1. Because the interpolation emission pattern EP21 and the normal emission pattern EP1 have the same brightness of light emitted per unit area, the interpolation emission pattern EP21 and the normal emission pattern EP1 are substantially indistinguishable from each other to the user. In this way, because the normal emission pattern EP1 and the interpolation emission patterns EP41, EP51, and EP21 around it are located adjacent to each other, the corresponding emission patterns may be substantially viewed as one area 1801 by the user, which means that up-scaling efficiency is low.

In the comparative example, similar to the above description, although the normal pixel 1713 provides the driving current to the interpolation pixels 1712, 1715, and 1716 located around it, the corresponding emission patterns may be substantially viewed as one area 1802 by the user. In addition, although the normal pixel 1717 provides the driving current to the interpolation pixels 1714, 1715, and 1718 located around it, the corresponding emission patterns may be substantially viewed as one area 1803 by the user. Moreover, although the normal pixel 1719 provides the driving current to the interpolation pixels 1715, 1716, and 1718 located around it, the corresponding emission patterns may be substantially viewed as one area 1804 by the user.

According to one or more embodiments of the present disclosure, by optimizing the position of the interpolation emission pattern, up-scaling efficiency may be improved.

Figure 13:
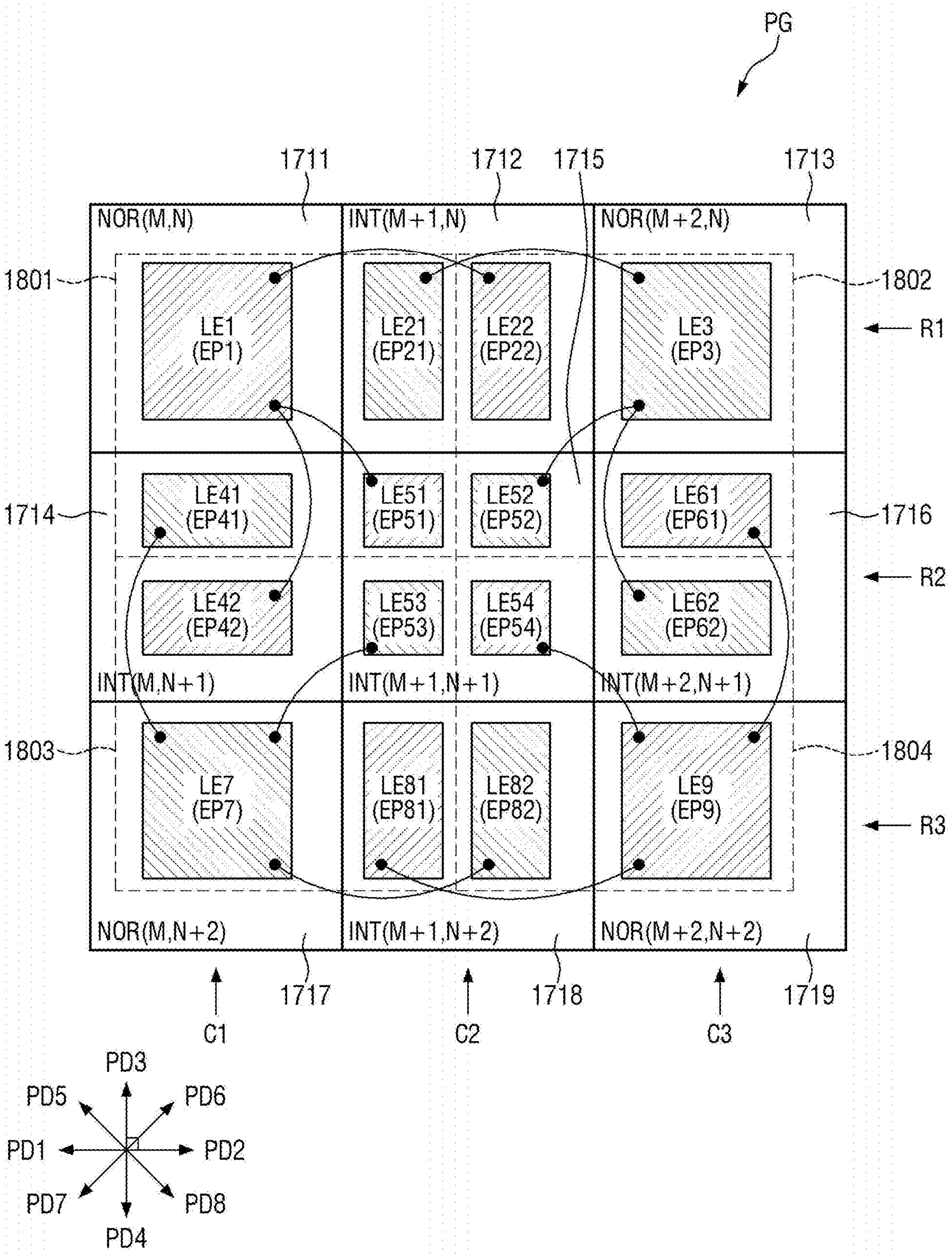
FIGS. 13 to 17 are layout diagrams showing emission patterns of pixels according to one or more embodiments.

FIG. 13 is a layout diagram showing an emission pattern of pixels according to one or more embodiments.

Unlike in the comparative example illustrated in FIG. 12, the first normal emission pattern of the normal pixel NP providing the first driving current and the first interpolation emission pattern receiving the first driving current are not located adjacent to each other in one or more embodiments shown in FIG. 13. For example, the normal light-emitting element LE1 of the normal pixel 1711 supplies a driving current to the interpolation light-emitting element LE22 of the interpolation pixel 1712. The interpolation emission pattern EP22 of the interpolation light-emitting element LE22 is not located adjacent to the normal emission pattern EP1 of the normal light-emitting element LE1, but is located adjacent to the normal emission pattern EP3 of the normal light-emitting element LE3. Instead, in the interpolation pixel 1712, the interpolation emission pattern EP21 connected to the normal light-emitting element LE3 is located adjacent to the normal emission pattern EP1 of the normal light-emitting element LE1. According to embodiments of the present disclosure, when performing an up-scaling operation, the boundary between the normal pixel and the interpolation pixel becomes more clear, enabling the user to view an upscaled high-resolution image.

Hereinafter, rules for the arrangement of the emission patterns according to one or more embodiments will be described in further detail.

Each of the plurality of interpolation pixels IP1 to IP8 includes the first interpolation light-emitting element (e.g., LE22) that receives a part of the first driving current from the first normal pixel (e.g., 1711), and the second interpolation light-emitting element (e.g., LE21) that receives a part of the second driving current from the second normal pixel (e.g., 1713). The first interpolation emission pattern (e.g., EP22) of the first interpolation light-emitting element (e.g., LE22) is located adjacent to the second normal pixel (e.g., 1713), and the second interpolation emission pattern (e.g., EP21) of the second interpolation light-emitting element (e.g., LE21) is located adjacent to the first normal pixel (e.g., 1711).

The first normal pixel (e.g., 1711) includes a first normal light-emitting element (e.g., LE1), and the second normal pixel (e.g., 1713) includes a second normal light-emitting element (e.g., LE3). The second interpolation emission pattern (e.g., EP21) is located between the first normal emission pattern (e.g., EP1) of the first normal light-emitting element (e.g., LE1) and the first interpolation emission pattern (e.g., EP22), and the first interpolation emission pattern (e.g., EP22) is located between the second normal emission pattern (e.g., EP3) of the second normal light-emitting element (e.g., LE3) and the second interpolation emission pattern (e.g., EP21). For example, as illustrated in FIG. 13, the interpolation emission pattern EP21 is located between the normal emission pattern EP1 and the interpolation emission pattern EP22 connected thereto. In addition, the interpolation emission pattern EP22 is located between the normal emission pattern EP3 and the interpolation emission pattern EP21 connected thereto.

The first and second interpolation pixels IP1 and IP2 receive a driving current from the normal pixel NP located in the first plane direction PD1 and the second plane direction PD2 of the first and second interpolation pixels IP1 and IP2, respectively. With respect to each of the first and second interpolation pixels IP1 and IP2, the first normal pixel is a pixel located in the first plane direction PD1 from each of the first and second interpolation pixels IP1 and IP2, and the second normal pixel is a pixel located in the second plane direction PD2 from each of the first and second interpolation pixels IP1 and IP2.

The third and fourth interpolation pixels IP3 and IP4 receive a driving current from the normal pixel NP located in the third plane direction PD3 and the fourth plane direction PD4 of the third and fourth interpolation pixels IP3 and IP4, respectively. With respect to each of the third and fourth interpolation pixels IP3 and IP4, the first normal pixel is a pixel located in the third plane direction PD3 from each of the third and fourth interpolation pixels IP3 and IP4, and the second normal pixel is a pixel located in the second plane direction PD2 from each of the third and fourth interpolation pixels IP3 and IP4. For example, as illustrated in FIG. 13, the interpolation emission pattern EP41 is located between the normal emission pattern EP1 and the interpolation emission pattern EP42 connected thereto. In addition, the interpolation emission pattern EP42 is located between the normal emission pattern EP7 and the interpolation emission pattern EP41 connected to the normal emission pattern EP7.

The fifth to eighth interpolation pixels IP5 to IP8 receive a driving current from the normal pixels NP located in the first to fourth diagonal directions PD5 to PD8 of the fifth to eighth interpolation pixels IP5 to IP8, respectively.

The fifth to eighth interpolation pixels IP5 to IP8 further include a third interpolation light-emitting element that receives a part of the third driving current from the third normal pixel, and a fourth interpolation light-emitting element that receives a part of the fourth driving current from the fourth normal pixel.

The third normal pixel includes a third normal light-emitting element, the fourth normal pixel includes a fourth normal light-emitting element, the third interpolation emission pattern of the third interpolation light-emitting element is located adjacent to the third normal pixel, and the fourth interpolation emission pattern of the fourth interpolation light-emitting element is located adjacent to the fourth normal pixel.

Figure 16:
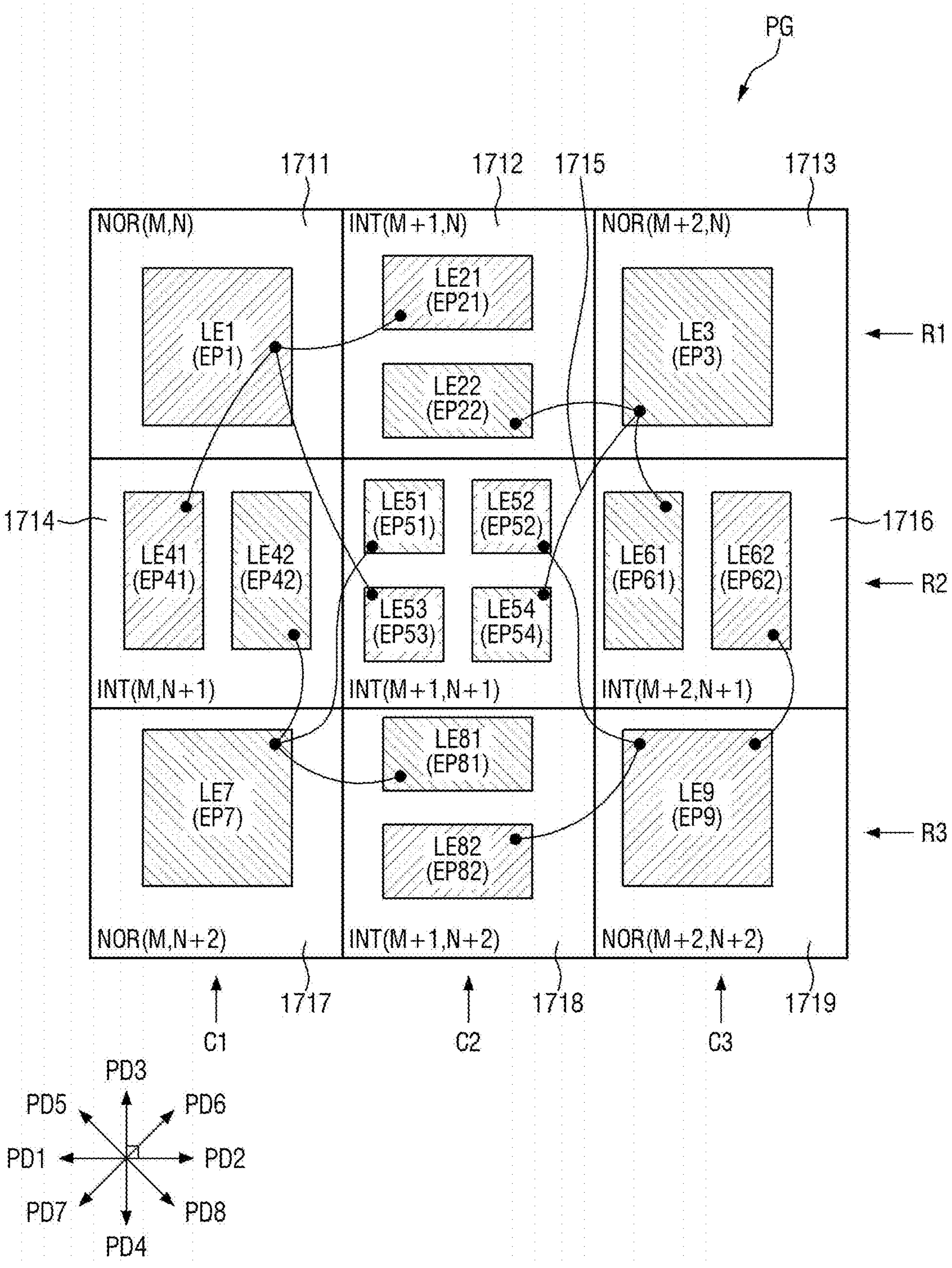
Figure 17:
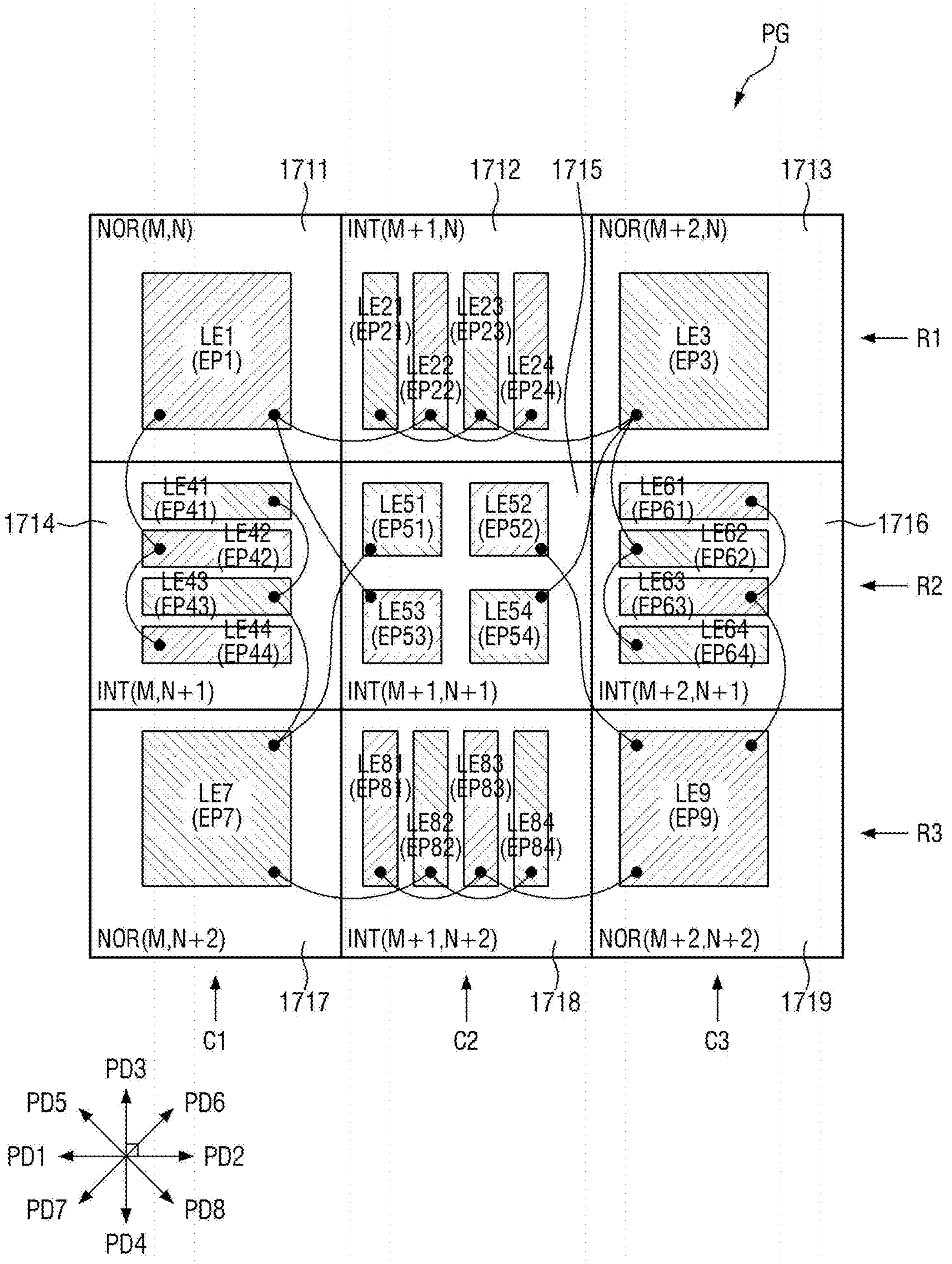

However, the disposition of the third interpolation emission pattern and the fourth interpolation emission pattern may be changed as in one or more embodiments of FIGS. 16 and 17. For example, as described later in FIGS. 16 and 17, the third interpolation emission pattern of the third interpolation light-emitting element may be located adjacent to the fourth normal pixel, and the fourth interpolation emission pattern of the fourth interpolation light-emitting element may be located adjacent to the third normal pixel.

With respect to each the fifth to eighth interpolation pixels IP5 to IP8, the first normal pixel is a pixel located in the first diagonal direction PD5 from each of the fifth to eighth interpolation pixels IP5 to IP8.

With respect to each of the fifth to eighth interpolation pixels IP5 to IP8, the second normal pixel is a pixel located in the second diagonal direction PD6 from each of the fifth to eighth interpolation pixels IP5 to IP8.

With respect to each of the fifth to eighth interpolation pixels IP5 to IP8, the third normal pixel is a pixel located in the third diagonal direction PD7 from each of the fifth to eighth interpolation pixels IP5 to IP8.

With respect to each of the fifth to eighth interpolation pixels IP5 to IP8, the fourth normal pixel is a pixel located in the fourth diagonal direction PD8 from each of the fifth to eighth interpolation pixels IP5 to IP8.

In the fifth to eighth interpolation pixels IP5 to IP8, the first to fourth interpolation emission patterns provided therein are located in a 2*2 matrix form. For example, as illustrated in FIG. 13, the interpolation pixel 1715 may include the interpolation emission pattern EP51 adjacent to the normal emission pattern EP1, the interpolation emission pattern EP52 adjacent to the normal emission pattern EP3, the interpolation emission pattern EP53 adjacent to the normal emission pattern EP7, and the interpolation emission pattern EP54 adjacent to the normal emission pattern EP9. In the fifth to eighth interpolation pixels IP5 to IP8, the arrangement of the first to fourth interpolation emission patterns is not limited to the shown example, and may be changed or modified in various ways to improve up-scaling efficiency, as explained in the present disclosure.

Figure 14:
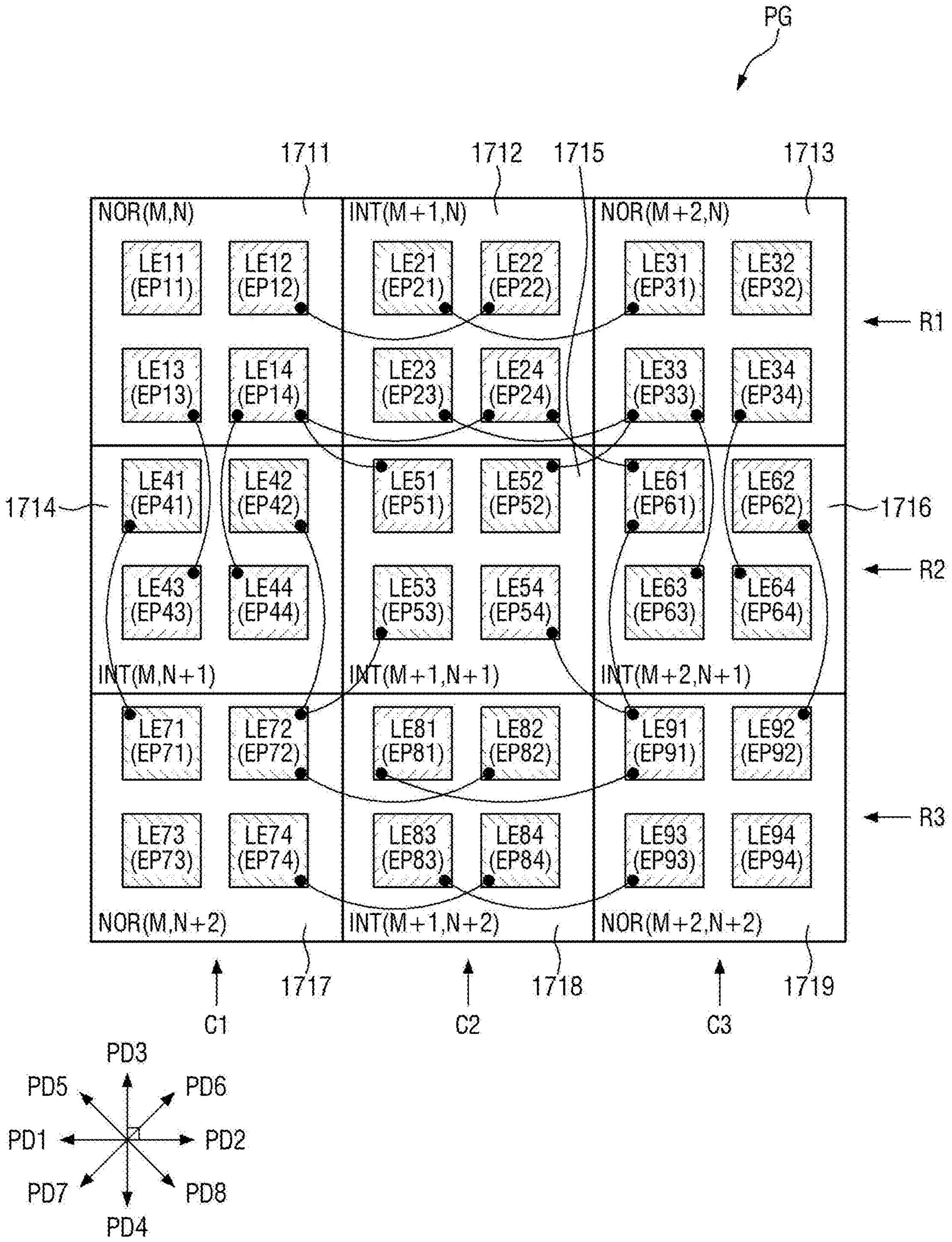

FIG. 14 is a layout diagram showing an emission pattern of pixels according to one or more embodiments.

The one or more embodiments corresponding to FIG. 14 is different from the one or more embodiments corresponding to FIG. 13 in that each normal pixel NP includes four normal emission patterns (e.g., EP11, EP12, EP13, and EP14), and each interpolation pixel includes four interpolation emission patterns (e.g., EP21, EP22, EP23, and EP24).

According to one or more embodiments, in the third and fourth interpolation pixels IP3 and IP4, a pair of third sub-interpolation emission patterns (e.g., EP43 and EP44) and a pair of fourth sub-interpolation emission patterns (e.g., EP41 and EP42) are located in a 2*2 matrix form.

According to one or more embodiments, in the first and second interpolation pixels IP1 and IP2, the first interpolation emission pattern includes a pair of first sub-interpolation emission patterns EP22 and EP24 separated from each other, and the second interpolation emission pattern includes a pair of second sub-interpolation emission patterns EP21 and EP23 separated from each other. In the first and second interpolation pixels IP1 and IP2, the pair of first sub-interpolation emission patterns (e.g., EP22 and EP24) and the pair of second sub-interpolation emission patterns (e.g., EP21 and EP23) are located in a 2*2 matrix form. For example, the normal pixel 1711 includes four normal light-emitting elements LE11, LE12, LE13, and LE14, and they include the normal emission patterns EP11, EP12, EP13, and EP14 distinguished from each other. In addition, the first to fourth interpolation pixels IP1 to IP4 located in the first and second plane directions PD1 and PD2 from the normal pixel NP have four interpolation light-emitting elements and four interpolation emission patterns. For example, the interpolation pixel 1712 includes interpolation light-emitting elements LE21, LE22, LE23, and LE24, and they include the interpolation emission patterns EP21, EP22, EP23, and EP24 that are distinguished from each other.

Figure 15:
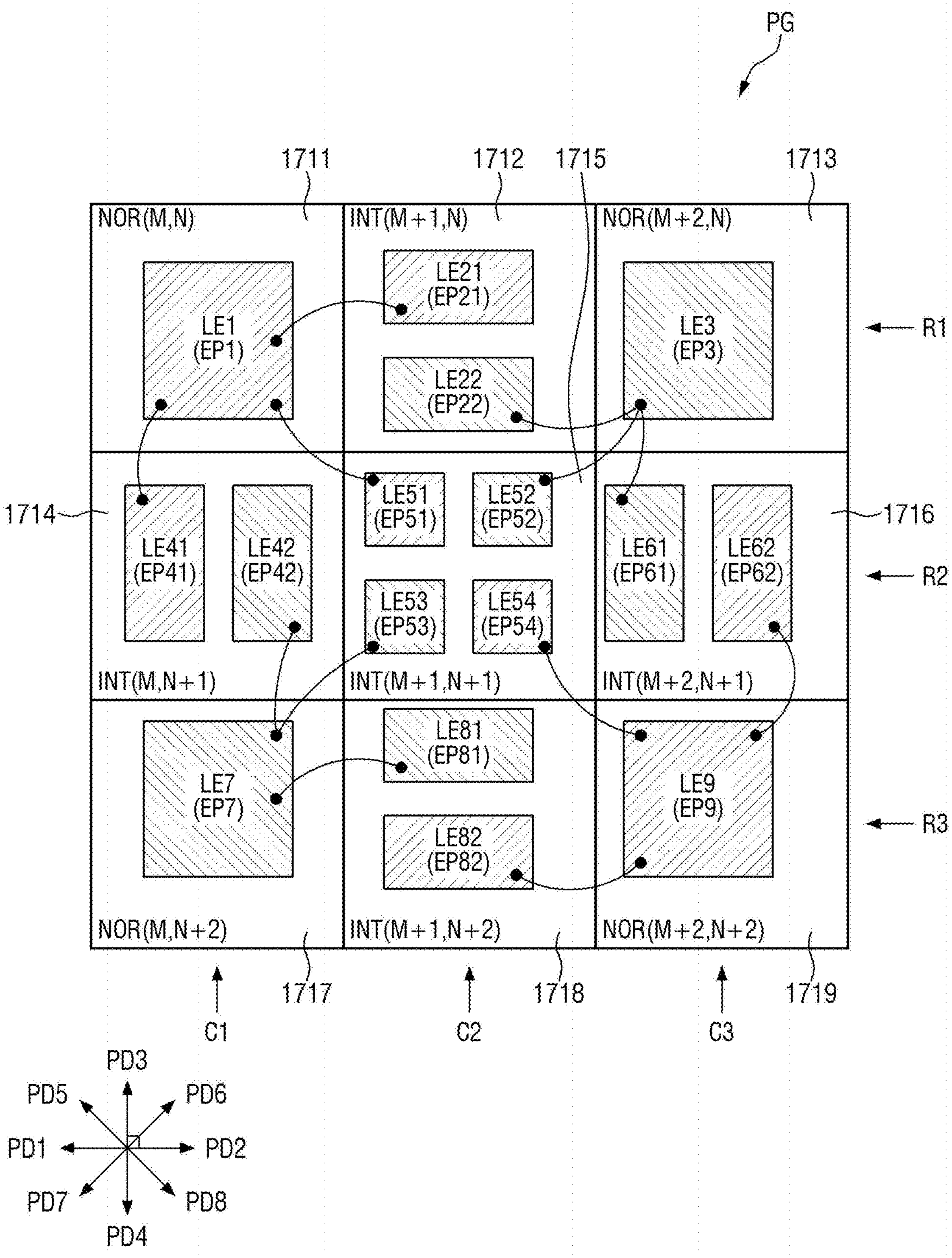

FIG. 15 is a layout diagram showing an emission pattern of pixels according to one or more embodiments.

The one or more embodiments corresponding to FIG. 15 is different from the one or more embodiments corresponding to FIG. 13 in that the arrangement of the interpolation emission patterns provided in the first to fourth interpolation pixels IP1 to IP4 is changed.

In the one or more embodiments corresponding to FIG. 13, the arrangement of the first and second interpolation emission patterns provided in the first and second interpolation pixels IP1 and IP2 is in the form of a 1*2 matrix. For example, in the interpolation pixel 1712 of FIG. 13, the interpolation emission patterns EP21 and EP22 are located in a 1*2 matrix form. In the one or more embodiments corresponding to FIG. 15, the arrangement of the first and second interpolation emission patterns provided in the first and second interpolation pixels IP1 and IP2 may be in the form of a 2*1 matrix. For example, in the interpolation pixel 1712 of FIG. 15, the interpolation emission patterns EP21 and EP22 are located in a 2*1 matrix form.

In addition, the one or more embodiments corresponding to FIG. 13 illustrates that the arrangement of the third and fourth interpolation emission patterns provided in the third and fourth interpolation pixels IP3 and IP4 is in the form of a 2*1 matrix. For example, in the interpolation pixel 1714 of FIG. 13, the interpolation emission patterns EP41 and EP42 are located in a 2*1 matrix form. In the one or more embodiments corresponding to FIG. 15, the arrangement of the third and fourth interpolation emission patterns provided in the third and fourth interpolation pixels IP3 and IP4 may be in the form of a 1*2 matrix. For example, in the interpolation pixel 1714 of FIG. 15, the interpolation emission patterns EP41 and EP42 are located in a 1*2 matrix form.

FIG. 16 is a layout diagram showing an emission pattern of pixels according to one or more embodiments.

The one or more embodiments corresponding to FIG. 16 differs from the one or more embodiments corresponding to FIG. 15 in that the arrangement of the interpolation emission patterns provided in the fifth to eighth interpolation pixels IP5 to IP8 is changed.

In the one or more embodiments corresponding to FIG. 15, each of the fifth to eighth interpolation pixels IP5 to IP8 includes the first to fourth interpolation emission patterns, and the first to fourth interpolation emission patterns are located adjacent to the normal pixel NP that supplies a driving current. For example, as illustrated in FIG. 15, the interpolation pixel 1715 includes the interpolation emission patterns EP51, EP52, EP53, and EP54. In the one or more embodiments corresponding to FIG. 15, the interpolation emission pattern EP51 is connected to the normal emission pattern EP1, and is located adjacent to the normal emission pattern EP1. Further, the interpolation emission pattern EP52 is connected to the normal emission pattern EP3, and is located adjacent to the normal emission pattern EP3. In addition, the interpolation emission pattern EP53 is connected to the normal emission pattern EP7, and is located adjacent to the normal emission pattern EP7. In addition, the interpolation emission pattern EP54 is connected to the normal emission pattern EP9, and is located adjacent to the normal emission pattern EP9.

On the other hand, according to the one or more embodiments corresponding to FIG. 16, the interpolation emission pattern EP51 is connected to the normal emission pattern EP7, and is located adjacent to the normal emission pattern EP1. Further, the interpolation emission pattern EP52 is connected to the normal emission pattern EP9, and is located adjacent to the normal emission pattern EP3. In addition, the interpolation emission pattern EP53 is connected to the normal emission pattern EP1, and is located adjacent to the normal emission pattern EP7. In addition, the interpolation emission pattern EP54 is connected to the normal emission pattern EP3, and is located adjacent to the normal emission pattern EP9.

FIG. 17 is a layout diagram showing an emission pattern of pixels according to one or more embodiments.

The one or more embodiments corresponding to FIG. 17 differs from the one or more embodiments corresponding to FIG. 16 in that the arrangement of the interpolation emission patterns provided in the first to fourth interpolation pixels IP1 to IP4 is changed.

Referring to FIG. 17, in the first and second interpolation pixels IP1 and IP2, the pair of first sub-interpolation emission patterns and a pair of second sub-interpolation emission patterns are located in a 1*4 matrix form. For example, in the interpolation pixel 1712, the interpolation emission patterns EP21, EP22, EP23, and EP24 are located in a 1*4 matrix form. Here, the interpolation emission patterns EP21 and EP23 may be connected to the normal emission pattern EP3 of the normal pixel 1713, and the interpolation emission patterns EP22 and EP24 may be connected to the normal emission pattern EP1 of the normal pixel 1711.

According to one or more embodiments, in the third and fourth interpolation pixels IP3 and IP4, the third interpolation emission pattern includes a pair of third sub-interpolation emission patterns (e.g., EP42 and EP44) separated from each other, and the fourth interpolation emission pattern includes a pair of fourth sub-interpolation emission patterns (e.g., EP41 and EP43) separated from each other. In the third and fourth interpolation pixels IP3 and IP4, the pair of third sub-interpolation emission patterns (e.g., EP42 and EP44) and the pair of fourth sub-interpolation emission patterns (e.g., EP41 and EP43) are located in the form of a 4*1 matrix. For example, the interpolation pixel 1714 includes the interpolation emission patterns EP41, EP42, EP43, and EP44, which are located in a 4*1 matrix form. Here, the interpolation emission patterns EP41 and EP43 may be connected to the normal emission pattern EP7 of the normal pixel 1717, and the interpolation emission patterns EP42 and EP44 may be connected to the normal emission pattern EP1 of the normal pixel 1711.

Figure 18:
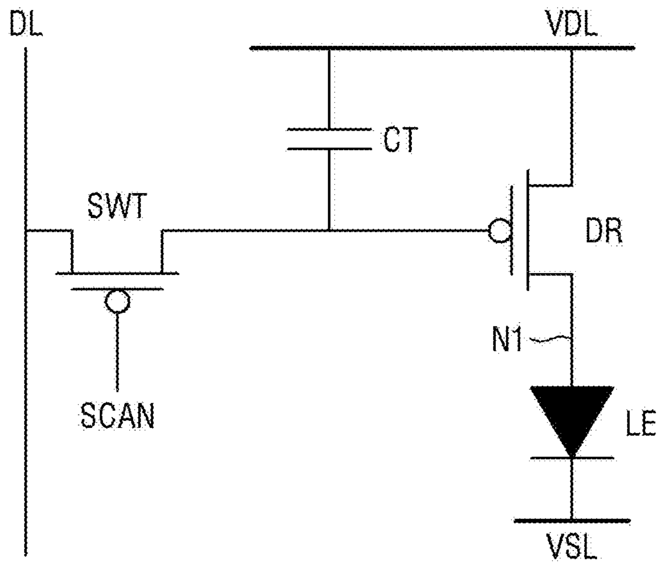
FIG. 18 is an equivalent circuit diagram of a normal pixel according to one or more embodiments.

FIG. 18 is an equivalent circuit diagram of the normal pixel NP according to one or more embodiments. For example, FIG. 18 may be an equivalent circuit diagram of the normal pixel NP described with reference to FIGS. 11 to 17.

Referring to FIG. 18, the normal pixel NP may further include a scan transistor SWT connected to the data line DL and controlled by a scan signal SCAN, the driving transistor DR that generates a driving current based on a data voltage provided from the scan transistor SWT, the light-emitting element LE that emits light according to the driving current of the driving transistor DR, and a capacitor CT connected between the gate electrode of the driving transistor DR and the second driving voltage line VDL to which the second driving voltage VDD of FIG. 2 is applied.

In concluding the detailed description, those skilled in the art will appreciate that many variations and modifications can be made to the embodiments without substantially departing from the aspects of the present disclosure. Therefore, the disclosed embodiments are used in a generic and descriptive sense only and not for purposes of limitation.

What is claimed is:

1. A display device comprising:

a display panel comprising a pixel group comprising a normal pixel, and interpolation pixels surrounding the normal pixel, wherein the normal pixel comprises a driving transistor, and a normal light-emitting element configured to receive a driving current from the driving transistor, wherein the interpolation pixels comprise a first interpolation light-emitting element configured to receive a part of a first driving current from a first normal pixel, and a second interpolation light-emitting element configured to receive a part of a second driving current from a second normal pixel, and wherein a first interpolation emission pattern of the first interpolation light-emitting element is adjacent to the second normal pixel, and a second interpolation emission pattern of the second interpolation light-emitting element is adjacent to the first normal pixel.

2. The display device of claim 1, wherein the first normal pixel comprises a first normal light-emitting element, wherein the second normal pixel comprises a second normal light-emitting element, wherein the second interpolation emission pattern is between a first normal emission pattern of the first normal light-emitting element and the first interpolation emission pattern, and wherein the first interpolation emission pattern is between a second normal emission pattern of the second normal light-emitting element and the second interpolation emission pattern.

3. The display device of claim 2, wherein the pixel group comprises:

the normal pixel at a center of the pixel group;

a first interpolation pixel in a first plane direction from the normal pixel;

a second interpolation pixel in a second plane direction, which is opposite to the first plane direction, from the normal pixel;

a third interpolation pixel in a third plane direction, which is substantially perpendicular to the first plane direction, from the normal pixel;

a fourth interpolation pixel in a fourth plane direction, which is opposite to the third plane direction, from the normal pixel;

a fifth interpolation pixel in a first diagonal direction, which is between the first plane direction and the third plane direction, from the normal pixel;

a sixth interpolation pixel in a second diagonal direction, which is between the second plane direction and the third plane direction, from the normal pixel;

a seventh interpolation pixel in a third diagonal direction, which is opposite to the second diagonal direction, from the normal pixel; and an eighth interpolation pixel in a fourth diagonal direction, which is opposite to the first diagonal direction, from the normal pixel.

4. The display device of claim 3, wherein the first and second interpolation pixels are configured to receive a driving current from the normal pixel in the first plane direction and the second plane direction of the first and second interpolation pixels, respectively.

5. The display device of claim 4, wherein, with respect to the first and second interpolation pixels, the first normal pixel is in the first plane direction from the first and second interpolation pixels, and wherein, with respect to the first and second interpolation pixels, the second normal pixel is in the second plane direction from the first and second interpolation pixels.

6. The display device of claim 5, wherein the third and fourth interpolation pixels are configured to receive a driving current from the normal pixel in the third plane direction and the fourth plane direction of the third and fourth interpolation pixels, respectively.

7. The display device of claim 6, wherein, with respect to the third and fourth interpolation pixels, the first normal pixel is in the third plane direction from the third and fourth interpolation pixels, and wherein, with respect to the third and fourth interpolation pixels, the second normal pixel is in the second plane direction from the third and fourth interpolation pixels.

8. The display device of claim 7, wherein the fifth, sixth, seventh, and eighth interpolation pixels are configured to receive a driving current from the normal pixel in the first, second, third, and fourth diagonal directions of the fifth, sixth, seventh, and eighth interpolation pixels, respectively.

9. The display device of claim 8, wherein the fifth, sixth, seventh, and eighth interpolation pixels further comprise a third interpolation light-emitting element configured to receive a part of a third driving current from a third normal pixel, and a fourth interpolation light-emitting element configured to receive a part of a fourth driving current from a fourth normal pixel.

10. The display device of claim 9, wherein the third normal pixel comprises a third normal light-emitting element, wherein the fourth normal pixel comprises a fourth normal light-emitting element, wherein a third interpolation emission pattern of the third interpolation light-emitting element is adjacent to the fourth normal pixel, and wherein a fourth interpolation emission pattern of the fourth interpolation light-emitting element is adjacent to the third normal pixel.

11. The display device of claim 10, wherein, with respect to the fifth, sixth, seventh, and eighth interpolation pixels, the first normal pixel is in the first diagonal direction from the fifth, sixth, seventh, and eighth interpolation pixels, the second normal pixel is in the second diagonal direction from the fifth, sixth, seventh, and eighth interpolation pixels, the third normal pixel is in the third diagonal direction from the fifth, sixth, seventh, and eighth interpolation pixels, and the fourth normal pixel is in the fourth diagonal direction from the fifth, sixth, seventh, and eighth interpolation pixels.

12. The display device of claim 11, wherein, in the fifth, sixth, seventh, and eighth interpolation pixels, the first, second, third, and fourth interpolation emission patterns are in a 2*2 matrix form.

13. The display device of claim 12, wherein, in the first and second interpolation pixels, the first interpolation emission pattern comprises a pair of first sub-interpolation emission patterns separated from each other, and the second interpolation emission pattern comprises a pair of second sub-interpolation emission patterns separated from each other.

14. The display device of claim 13, wherein, in the first and second interpolation pixels, the pair of first sub-interpolation emission patterns and the pair of second sub-interpolation emission patterns are in a 2*2 matrix form.

15. The display device of claim 13, wherein, in the first and second interpolation pixels, the pair of first sub-interpolation emission patterns and the pair of second sub-interpolation emission patterns are in a 1*4 matrix form.

16. The display device of claim 12, wherein, in the third and fourth interpolation pixels, the third interpolation emission pattern comprises a pair of third sub-interpolation emission patterns separated from each other, and the fourth interpolation emission pattern comprises a pair of fourth sub-interpolation emission patterns separated from each other.

17. The display device of claim 16, wherein, in the third and fourth interpolation pixels, the pair of third sub-interpolation emission patterns and the pair of fourth sub-interpolation emission patterns are in a 2*2 matrix form.

18. The display device of claim 17, wherein, in the third and fourth interpolation pixels, the pair of third sub-interpolation emission patterns and the pair of fourth sub-interpolation emission patterns are in a 4*1 matrix form.

19. A mobile electronic device comprising:

a display panel in which a normal pixel, and interpolation pixels surrounding the normal pixel, form a pixel group, wherein the normal pixel comprises a driving transistor, and a normal light-emitting element configured to receive a driving current from the driving transistor, wherein the interpolation pixels comprise a first interpolation light-emitting element configured to receive a part of a first driving current from a first normal pixel, and a second interpolation light-emitting element configured to receive a part of a second driving current from a second normal pixel, and wherein a first interpolation emission pattern of the first interpolation light-emitting element is adjacent to the second normal pixel, and a second interpolation emission pattern of the second interpolation light-emitting element is adjacent to the first normal pixel.

20. The mobile electronic device of claim 19, wherein the first normal pixel comprises a first normal light-emitting element, wherein the second normal pixel comprises a second normal light-emitting element, wherein the second interpolation emission pattern is between a first normal emission pattern of the first normal light-emitting element and the first interpolation emission pattern, and wherein the first interpolation emission pattern is between a second normal emission pattern of the second normal light-emitting element and the second interpolation emission pattern.

* * * * *